United States Patent [19]

Idelson

[11] 4,247,455
[45] Jan. 27, 1981

[54] YELLOW 2:1 AZO-AZO OR AZO-AZOMETHINE CHROME COMPLEXED DYE DEVELOPERS

[75] Inventor: Elbert M. Idelson, Newton Lower Falls, Mass.

[73] Assignee: Polaroid Corporation, Cambridge, Mass.

[21] Appl. No.: 930,152

[22] Filed: Aug. 2, 1978

Related U.S. Application Data

[62] Division of Ser. No. 836,076, Sep. 23, 1977, Pat. No. 4,174,221.

[51] Int. Cl.$^3$ .................... C07C 107/04; C09B 45/06; C09B 45/16; G03C 5/54
[52] U.S. Cl. .................... 260/145 B; 260/146 R; 260/146 D; 260/146 T; 260/147; 260/154; 260/163; 260/438.5 R; 260/463; 564/381; 568/308; 568/322; 430/222
[58] Field of Search ........... 260/145 B, 146 D, 146 T, 260/147, 149, 150, 151, 438.5 R

[56] References Cited

U.S. PATENT DOCUMENTS

| | | | |
|---|---|---|---|
| 3,202,511 | 8/1965 | Mory et al. | 260/151 X |
| 3,208,991 | 9/1965 | Blout et al. | 260/162 |
| 3,299,041 | 1/1967 | Green et al. | 260/197 |
| 3,544,545 | 12/1970 | Idelson | 260/147 |
| 3,551,406 | 12/1970 | Idelson | 260/147 |
| 3,597,200 | 8/1971 | Idelson | 96/29 |
| 3,705,184 | 12/1972 | Goulston et al. | 260/438.5 R |
| 3,752,836 | 8/1973 | Idelson | 260/438.5 R |

OTHER PUBLICATIONS

Venkataraman, "The Chemistry of Synthetic Dyes," vol. III, p. 305 (1970).

Primary Examiner—Floyd D. Higel
Attorney, Agent, or Firm—Gaetano D. Maccarone

[57] ABSTRACT

Novel yellow 2:1 azo-azo or azo-azomethine chrome complexed dye developer particularly useful in diffusion transfer photographic products and processes are presented by this invention. The novel 2:1 chrome complexed dye developers have the following structure:

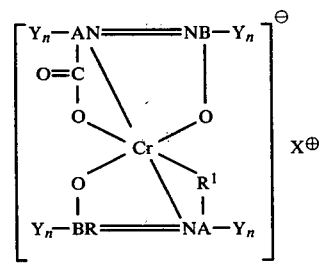

where each A is a phenyl radical; each B is a phenyl or nitrogen containing heterocyclic radical; Y is a silver halide developing substituent; each n is 0 or 1 but at least one n must be 1; R is N or CH; $R^1$ is

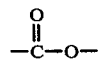

if R is N but $R^1$ is —O— if R is CH and X is a cation.

13 Claims, 5 Drawing Figures

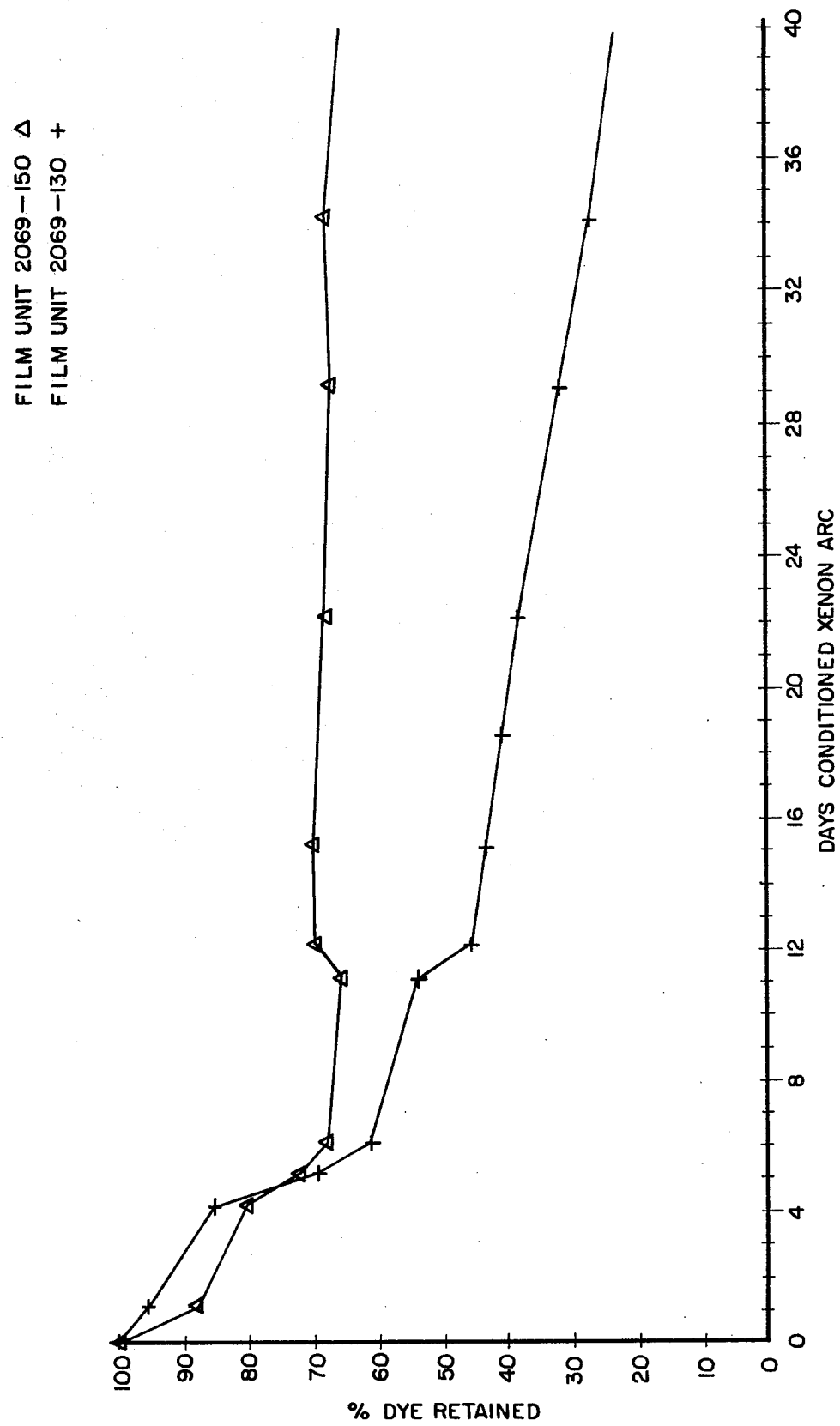

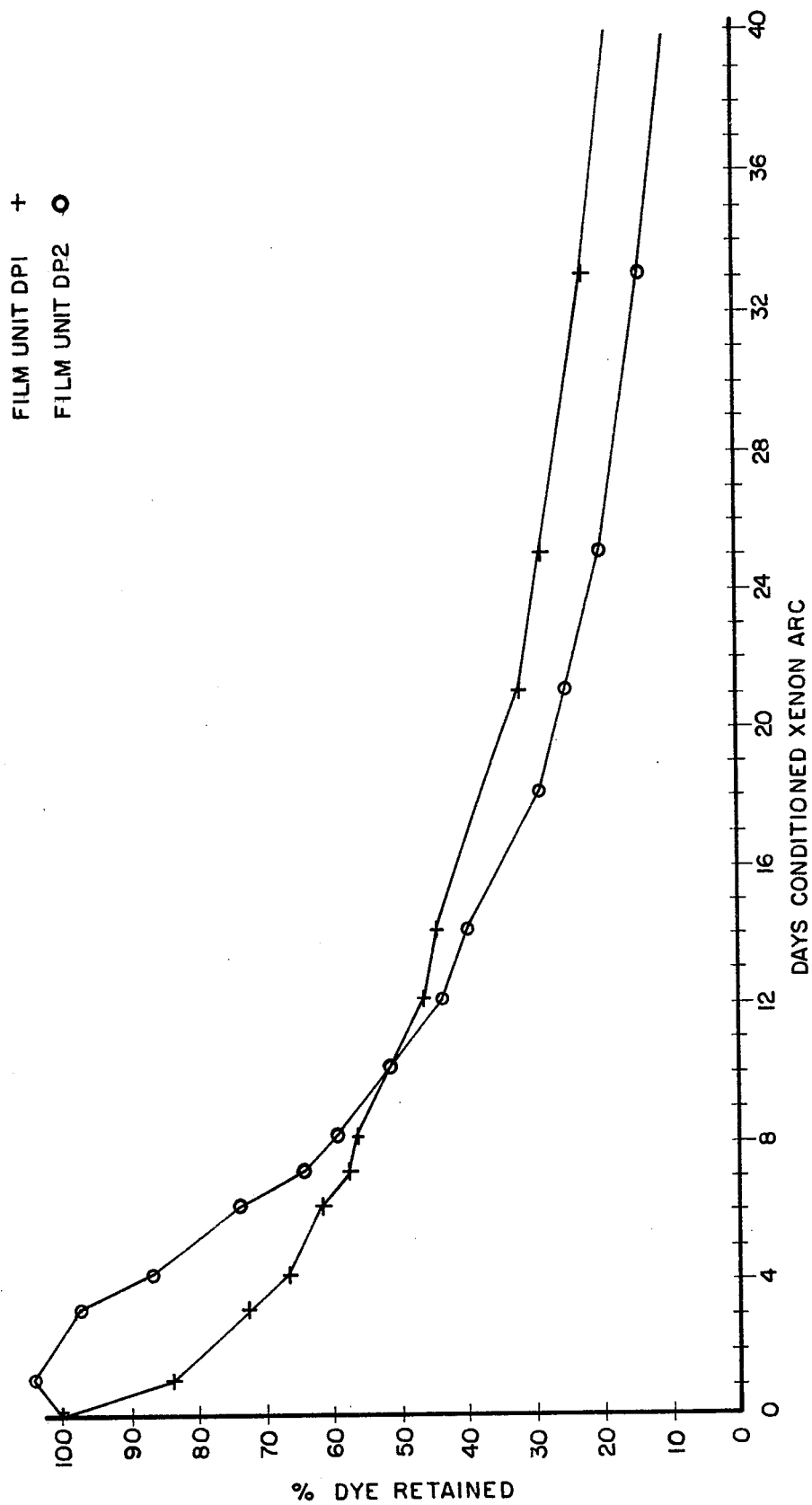

YELLOW 2:1 AZO-AZO OR AZO-AZOMETHINE CHROME COMPLEXED DYE DEVELOPERS

CROSS-REFERENCE TO RELATED APPLICATIONS

This application is a division of prior copending application Ser. No. 836,076, filed Sept. 23, 1977 now U.S. Pat. No. 4,174,221.

BACKGROUND OF THE INVENTION

Part 1. The Field of the Invention

This invention relates to dyes and particularly to novel 2:1 chrome-complexed yellow dyes having a silver halide developing capability and also relates to photographic products and processes using the novel dyes.

Part 2. Description of the Prior Art

Metal-complexed dyes are old and known to the art. One group of metal-complexed dyes are those referred to in the art as 1:1 complexes, a term embracing complexes of one dye molecule complexed to a metal ion. Metal-complexed dyes having two dye molecules complexed to a metal ion are also known to the art and are referred to as 2:1 complexes. For example, U.S. Pat. No. 3,730,725 describes a 2:1 chrome-complexed red dye. In general, 1:1 metal complexes of a given dye molecule and a metal have narrower absorption spectra and brighter color than a 2:1 complex of the same dye and metal. The corresponding 2:1 complex generally exhibits a rather broad absorption spectrum and dull color.

Metal-complexed dyes having a silver halide developing capability, e.g., metal-complexed dye developers, are also known to the art and are described, for example, in U.S. Pat. Nos. 3,218,164; 3,453,107; 3,482,972; 3,544,545; 3,551,406; 3,597,200; 3,705,184; 3,752,836 and 3,857,855 among others.

Above-mentioned U.S. Pat. Nos. 3,597,200; 3,705,184 and 3,752,836 particularly relate to 1:1 chrome-complexed yellow dye developers which can be illustrated schematically as follows:

DYE-CHROMIUM-LIGAND DEVELOPER.

Particularly useful 1:1 chrome-complexed yellow dye developers are described in referenced U.S. Pat. No. 3,705,184 and these conform to the following formula:

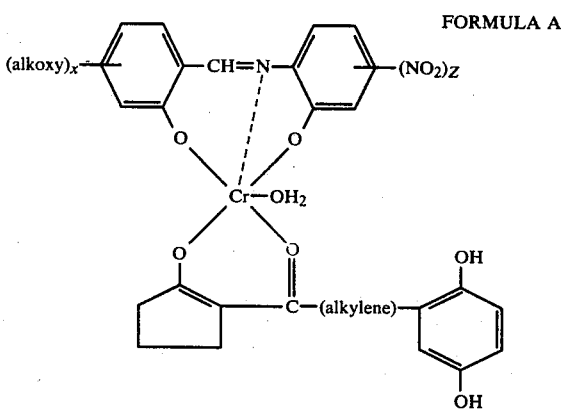

FORMULA A where x can be 1–3, Z can be 1–3, (alkoxy) has from 1–8 carbon atoms and (alkylene) contains 1–6 carbon atoms.

A specific dye developer of Formula A having especially efficient performance characteristics and one which has enjoyed extensive commercial success is the 1:1 chrome-complexed yellow dye developer of the formula:

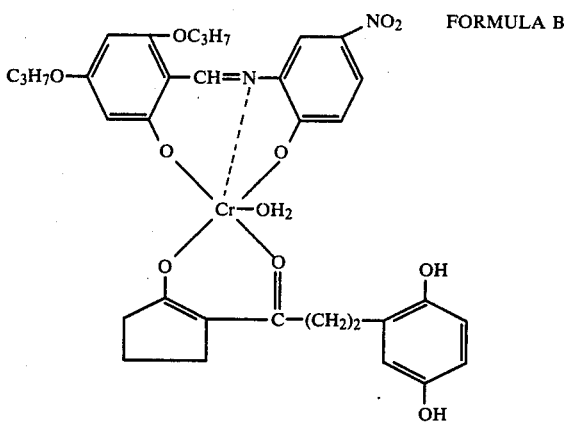

FORMULA B

The present invention provides novel 2:1 chrome-complexed yellow dyes having a silver halide developing capability. As a class, the novel 2:1 chrome-complexed dye developers of the invention have desirable performance characteristics especially when employed in diffusion transfer photographic products and processes. As will be demonstrated later, certain 2:1 chrome-complexed dye developers within the class presented have performance characteristics comparable to and in certain respects, superior to those of 1:1 chrome complexed yellow dye developers of Formulae A and B.

SUMMARY OF THE INVENTION

The novel 2:1 chrome-complexed yellow dye developers of this invention are 2:1 complexes of two ortho carboxy, ortho' hydroxy azo dyes, and 2:1 complexes of an ortho carboxy, ortho' hydroxy azo dye and an ortho, ortho' dihydroxy azomethine dye. Accordingly, the novel 2:1 chrome complexed yellow dye developers of this invention are broadly defined by the following general formula:

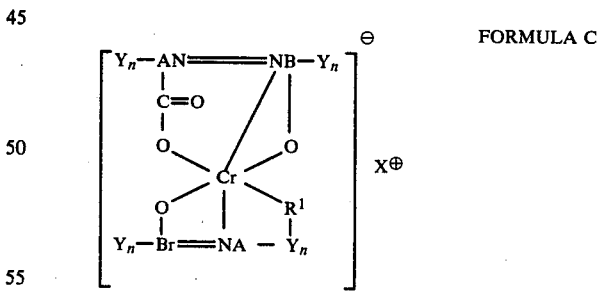

FORMULA C where each A is a phenyl radical, which includes substituted derivatives of such radicals; each B is a phenyl or nitrogen containing heterocyclic radical such as pyrazolone or pyrimidine radicals including substituted derivatives of such radicals, Y is a silver halide developing substituent; each n is 0 or 1 but at least one n must be 1; R is N or CH, and $R^1$ is

if R is N but R¹ is —O— if R is CH and X can be any cation that will not impair photographic processing of the dye developer and is preferably H₃O or it may also be incorporated in the dye as an onium salt.

As will be apparent from the detailed discussion which follows, particularly preferred 2:1 chrome-complexed yellow dye developers of this invention include two distinct types. The first type are 2:1 chrome complexes of ortho carboxy, ortho' hydroxy azo dyes which can be the same or different azo dyes. The second type are mixed 2:1 chrome complexes of ortho carboxy, ortho' hydroxy azo dyes and ortho, ortho' dihydroxy azo methine dyes. These two types of 2:1 chrome-complexed yellow dye developers can be represented by the following general formulae:

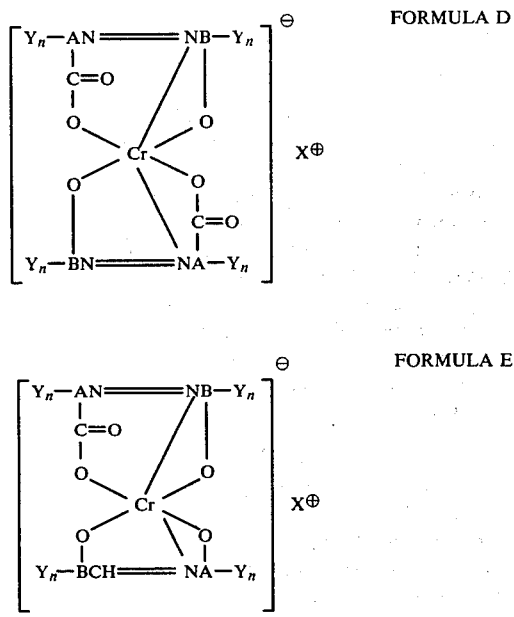

FORMULA D

FORMULA E where A, B, Y, X and n in the above formulae are as described before.

For the present invention, a silver halide developing substituent (Y) is one containing a phenyl or naphthyl nucleus containing at least a hydroxy and/or amino substituent ortho or para to another such substituent. Silver halide developing substituents of this type are well known to the art as evidenced, for example, by Photography, Its Materials and Processes, 6th Edition by Neblette, published by D Van Nostrand Company, Inc. (1962), pp. 231-234. A preferred group of developing substituents are the hydroquinonyls, including substituted derivatives such as chloro, alkyl, phenyl and/or alkoxy substituted derivatives of hydroquinone.

In addition to the silver halide developing substituents, the benzene or naphthalene nucleus may contain substituents linking the developing moiety to the azo and/or azo methine dye moiety. Such linking substituents include amino phenyl alkyl-thio substituents such as disclosed in U.S. Pat. No. 3,009,958; amino alkyl-amino substituents such as disclosed in U.S. Pat. No. 3,002,997; amino phenyl alkyl substituents such as disclosed in U.S. Pat. No. 3,043,690; amino-alkyl substituents such as disclosed in U.S. Pat. No. 3,062,884; amino phenyl substituents such as disclosed in U.S. Pat. No. 3,142,564; amino phenoxy substituents such as disclosed in U.S. Pat. No. 3,061,434 as well as the various linking substituents disclosed in U.S. Pat. No. 3,255,001.

Details relating to the 2:1 chrome-complexed yellow dye developers included within the scope of the present invention as well as manners of making them and of using them in photographic products and processes will be more fully appreciated by the following description of the preferred embodiments.

BRIEF DESCRIPTION OF THE FIGURES

FIGS. 4 and 5 graphically depict dye stability data obtained in Examples 9 and 10.

THE PREFERRED FILM UNITS OF THE INVENTION

The particularly preferred film units of the present invention are integral negative-positive film units of the type described in detail in U.S. Pat. Nos. 3,415,644 and 3,647,437.

Figure 1:
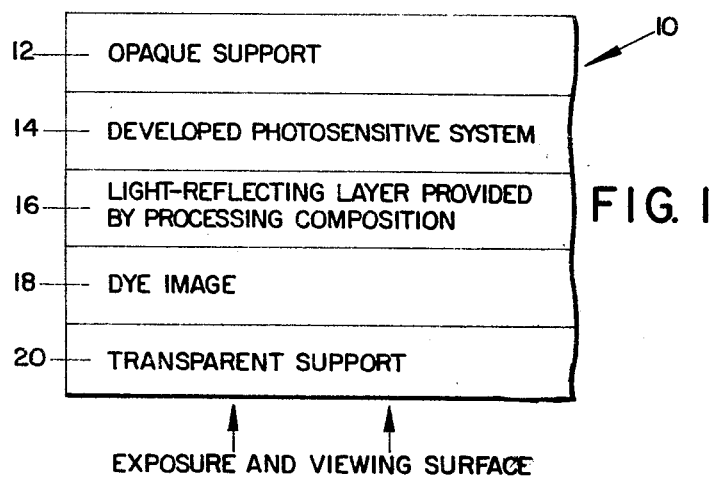
FIGS. 1-3 are simplified, schematic views of arrangements of essential elements of preferred film units of the present invention, shown after exposure and processing.

A representative particularly preferred film unit is shown as 10 (FIG. 1) and includes a light-reflecting layer provided by a light-reflecting pigment in a processing composition initially present in a rupturable processing container (not shown) and distributed after photoexposure of photosensitive layer(s) 14 through transparent support 20 and image-receiving layer 18. Processing compositions used in such film units are aqueous alkaline photographic processing compositions comprising an opacifying system which include a titanium dioxide pigment as the light-reflecting agent, preferably in combination with an optical filter agent described in detail in U.S. Pat. No. 3,647,437. When the processing composition is distributed over all portions of photoexposed photosensitive system 14, a light-reflecting layer 16 comprising the titanium dioxide is provided between image-receiving layer 18 and photosensitive layer 14. Application of the processing composition initiates development of photoexposed photosensitive layer(s) 14 in manner well known to the art to establish an imagewise distribution of diffusible image-providing material which can comprise silver but preferably comprises one or more dye image-providing material. The diffusible image-providing material(s) is transferred through permeable, light-reflecting titanium dioxide-containing layer 16 where it is mordanted, precipitated or otherwise retained in known manner in image-receiving layer 18. The transfer image is viewed through transparent support 20 against light-reflecting layer 16.

Figure 2:
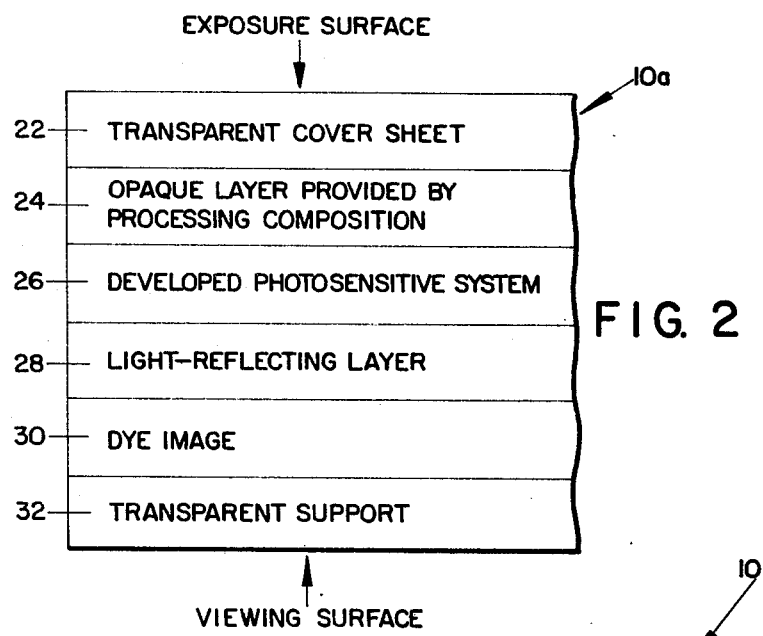

FIG. 2 shows an arrangement of essential elements of an integral negative-positive film unit of the type described in U.S. Pat. No. 3,594,165 and British Pat. No. 1,330,524 following exposure and processing. The film unit 10a includes a processing composition initally retained in a rupturable container (not shown) and distributed between cover sheet 22 and photosensitive system or layer 26 after photoexposure of photosensitive element(s) 26 through transparent cover sheet 22. Processing compositions used in such film units are aqueous alkaline photographic processing compositions which include an opacifying system comprising an opaque pigment which need not be—and usually is not—light reflecting. After distribution of the processing composition between transparent cover sheet 22 and photoexposed photosensitive layer 26, an opaque layer 24 is installed which protects layer 26 from further photoexposure through cover sheet 22. Like the film units of FIG. 1, as and after opaque layer 24 is installed, the processing composition initiates development of photoexposed photosensitive layer 26 to establish an imagewise distribution of the image-providing materials in manners well known to the art. For example, the processing composition alone may cause development or developing agents may be in the processing composition initially and/or the agents may be in the film unit so that they may be carried to layer 26 by the processing composition. The imagewise distributon is transferred through permeable light reflecting pigment containing layer 28 to dye image element 30 for viewing through transparent support 32 against the light reflecting pigment containing layer 28. Oftentimes an opaque layer (not shown) is positioned between reflecting layer 28 and photosensitive layer 26.

Figure 3:
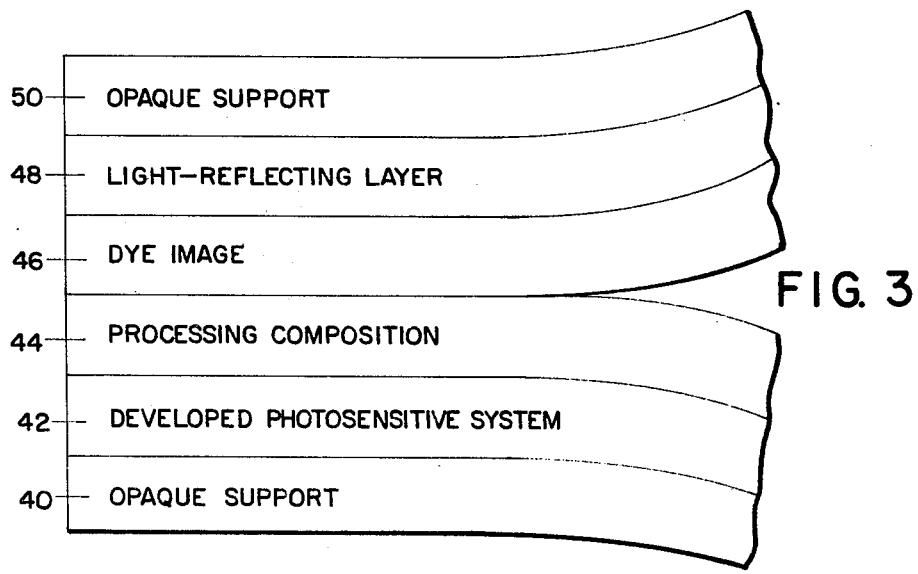

The novel dye developers of the present invention also may be utilized in film units designed to be separated after processing such as those described in U.S. Pat. No. 2,943,606. Such a diffusion transfer film unit of the present invention is shown in FIG. 3 as 10b. The film unit shown there comprises a photosensitive element having an opaque support 40 carrying a photosensitive system containing layer(s) 42. In film units of this type the photosensitive element is photoexposed and processing composition 44 is then distributed over the photoexposed system. During processing an image-receiving element comprising dye image layer 46 carried by support 50—preferably opaque—is superposed on the photoexposed photosensitive element. Like the film units of FIGS. 1 and 2, the processing composition permeates layer(s) 42 to provide an imagewise distribution of diffusible dye image-providing materials which is transferred to dye image layer 46. Unlike the film units of FIGS. 1 and 2, however, the transferred dye image is viewed in layer 46 against light-reflecting background layer 48 after separation of the image-receiving element from the photosensitive element.

THE PREFERRED EMBODIMENTS OF THE INVENTION

Representative specific 2:1 chrome-complexed yellow dye developers of the present invention include those of the following formulae:

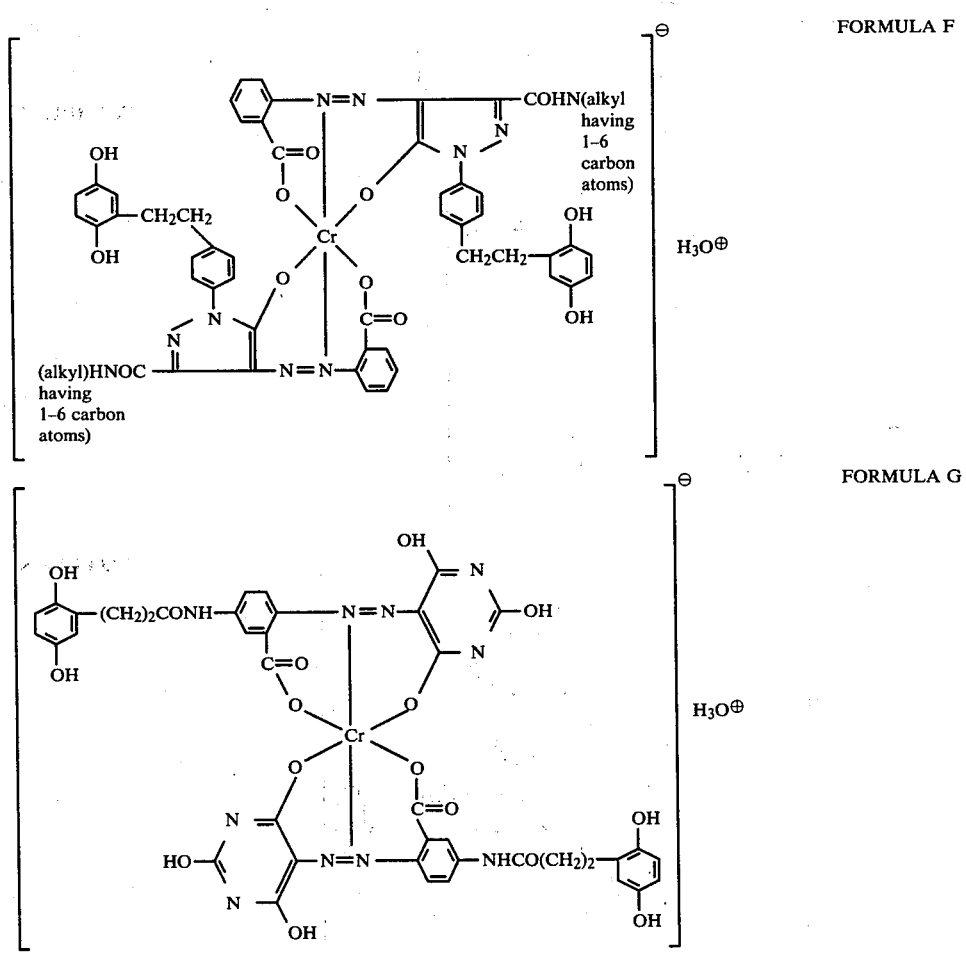

-continued
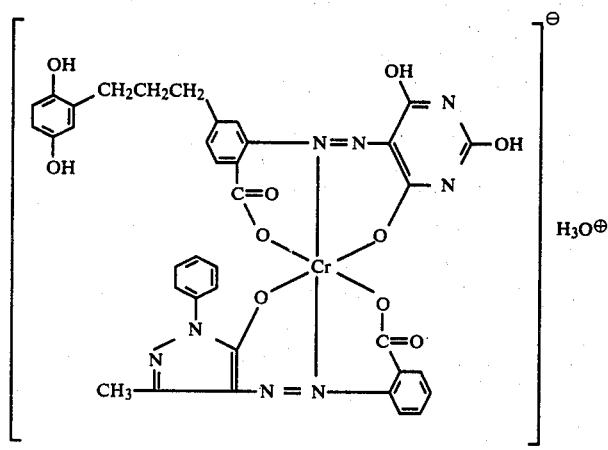
FORMULA H
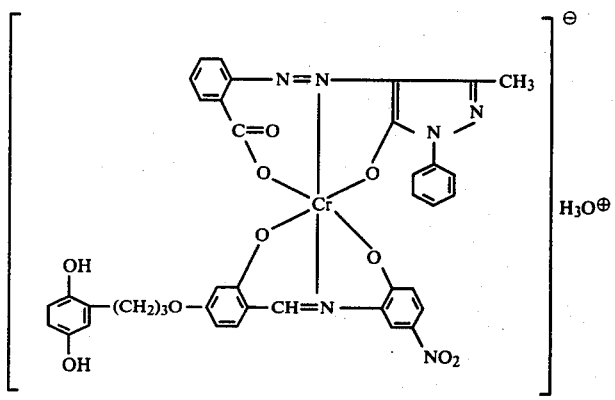
FORMULA I
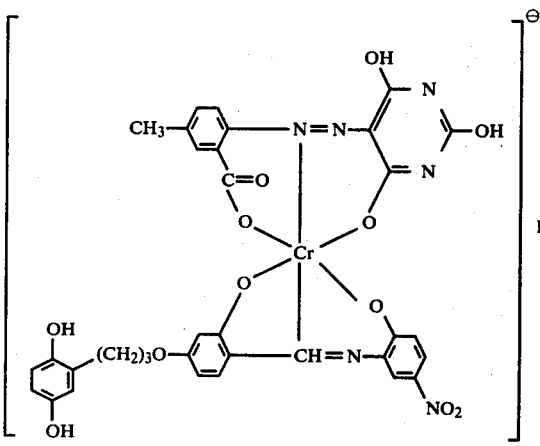
FORMULA J
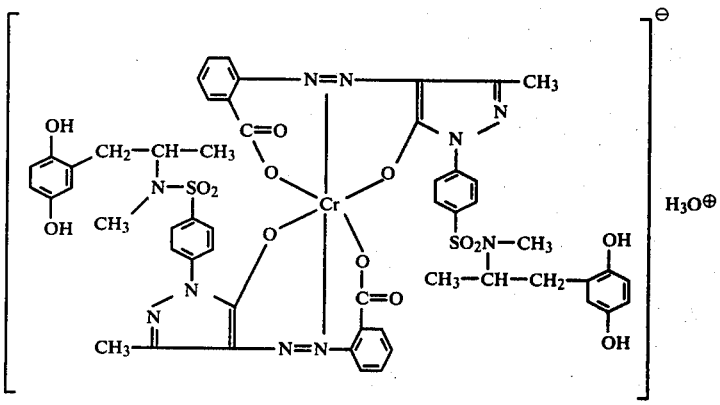
FORMULA K

FORMULA L

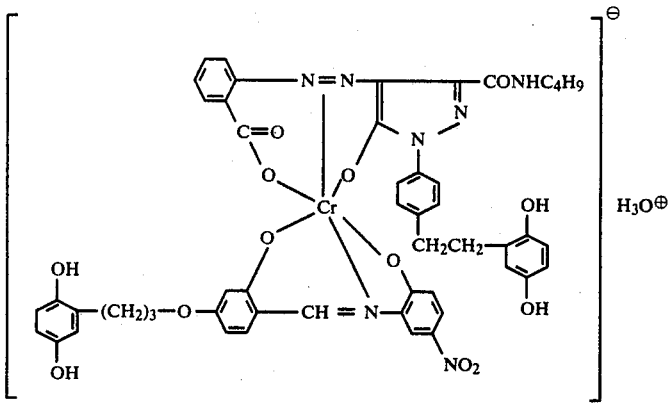

FORMULA M

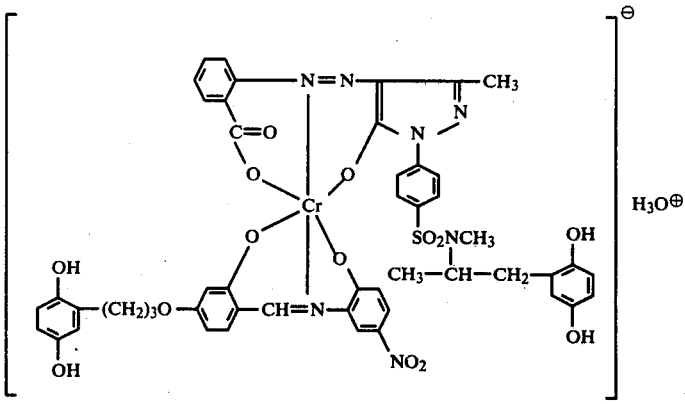

As mentioned before, certain species within the general class of 2:1 chrome-complexed yellow dyes presented by this invention have been found to have especially desirable performance characteristics. For example, 2:1 chrome-complexed yellow dye developers of the type illustrated by Formula K are excellent yellow dye developers. Likewise, 2:1 chrome complexes of an ortho carboxy, ortho' hydroxy azo dye and an ortho, ortho' dihydroxy azomethine dye of the type illustrated by Formula M provide preferred performance characteristics. Accordingly, the particularly preferred 2:1 chrome-complexed yellow dye developers which comprise two ortho carboxy, ortho' hydroxy azo dyes are those defined by the following general formula:

FORMULA N

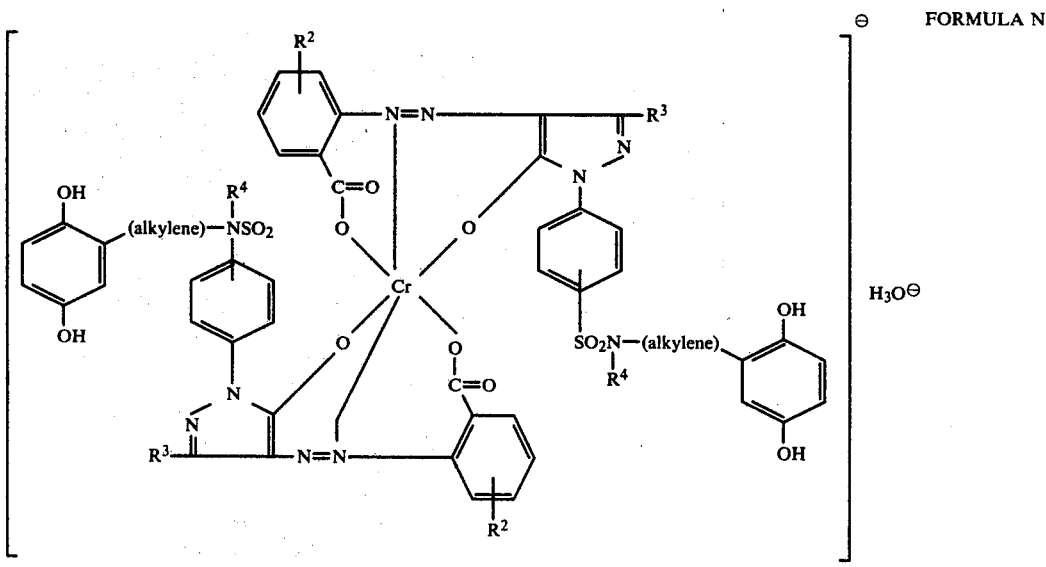

where $R^2$ represents any substituent which will not impair the yellow absorption characteristics of the dye moiety or impair the functionality of the 2:1 complex as a dye developer and can be, for example, hydrogen, or alkyl preferably lower alkyl having 1-4 carbon atoms; $R^3$ is hydrogen, hydroxyl, alkyl having 1-6 carbon atoms or

(-alkyl having 1-6 carbon atoms); -(alkylene)- has from 0-6 carbon atoms and $R^4$ is hydrogen or alkyl; preferably lower alkyl.

Also, the particularly preferred 2:1 chrome-complexed yellow dye developers of this invention which comprise a complex of an ortho carboxy, ortho' hydroxy azo dye and an ortho, ortho' dihydroxyazomethine dye are those defined by the following general formula:

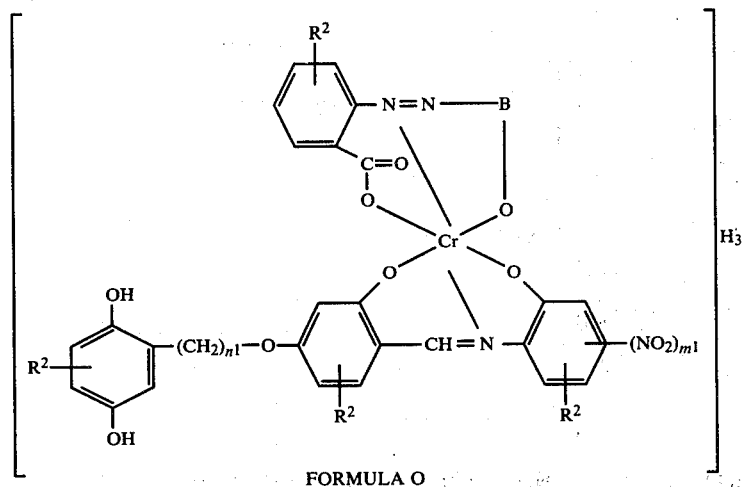

FORMULA O where $R^2$ is as defined before, $n^1$ is the integer 1-8, $m^1$ is the integer 1 or 2 and B is the radical:

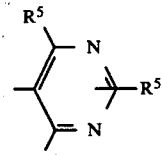

where $R^5$ is hydrogen or hydroxy or, B can be the radical:

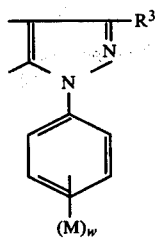

where $R^3$ is as defined before; M is

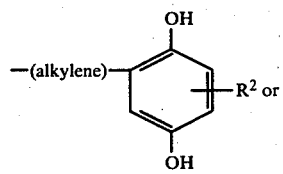

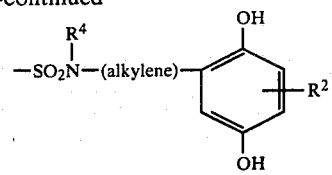

while w is the integer 0 or 1.

From the foregoing it should be appreciated that the 2:1 chrome-complexed yellow dye developers of this invention include at least one ortho carboxy, ortho' hydroxy azo dye chrome complexed to the same or different ortho carboxy, ortho' hydroxy azo dye or chrome complexed to an ortho, ortho' dihydroxy azomethine dye. Accordingly, yellow ortho carboxy, ortho' hydroxy azo dyes suitable in the practice of the present invention can be broadly defined by the following general formula:

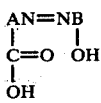

where A and B are as defined before. Yellow ortho carboxy, ortho' hydroxy dyes within the above formula can be prepared according to known procedures. Essentially, the preparation of such azo dyes involves the diazotization of an aromatic ortho carboxy amine and coupling of the diazotized amine in known manners with an aromatic, heterocyclic, or active methylene compound which can provide a hydroxy group ortho to the azo linkage. Such aromatic or heterocyclic compounds are known and include, for example, amino, beta naphthols and acetoacetanilides among others.

Yellow ortho, ortho' dihydroxy azomethine dyes useful in preparing 2:1 chrome-complexed azo, azomethine yellow dye developers included in the invention can be broadly defined by the following general formula:

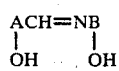

when A and B are as defined before. Such yellow azomethines can be prepared generally by reacting an aldehyde of the general formula:

where the hydroxy group is ortho to the aldehyde substituent, with an amine of the general formula:

The 2:1 chrome-complexed yellow dye developers of the present invention include a silver halide developing substituent integrated with at least one of the A or B moieties of the complexable azo and azomethine dyes described above. Accordingly, complexable yellow azo or azomethine dyes having a silver halide developing substituent can be defined by the following general formula:

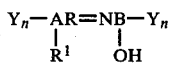

where A, B, Y, R, $R^1$ and n are as defined before. Silver halide substituents (Y) as well as manners for integrating them with the A or B moieties comprising the complexable dyes of the above formula are well known to the art. Details relating to such substituents and ways of integrating them with such A and B moieties can be found in the referenced patents as well as in U.S. Pat. Nos. as 3,086,005; 3,134,762; 3,141,772; 3,236,643; 3,235,645; 3,252,990; 3,299,041. In some instances, it may be desirable to employ a protected form of the silver halide developing substituent, that is, silver halide substituents where the hydroxy groups are replaced by acyloxy, benzyloxy, cathyloxy, alkoxy or acetoxy substituents. These protected silver halide developing substituents can be converted to the dihydroxy phenyl developing substituents in known manners at some time before or after complexing.

Chrome complexing of the dye moieties or dye developer moieties of the 2:1 chrome-complexed yellow dyes of this invention can be accomplished according to known procedures including those described in U.S. Pat. No. 2,028,981. Preferably, a chrome salt is reacted first with one of the dyes or dye developers to form the 1:1 complex which is then reacted with another dye or dye developer to provide a 2:1 chrome-complexed yellow dye having a silver halide developing capability and where one of the complexed moieties is an ortho carboxy, ortho hydroxy azo dye. Specific details relating to the preparation of particularly preferred 2:1 chrome-complexed yellow dye developers of the present invention will be better appreciated by reference to the following illustrative Examples.

Examples 1-5 which follow deal with the preparation of a 2:1 chrome-complexed dye developer of Formula N.

EXAMPLE 1

This Example illustrates a preparation of an ortho carboxy, ortho' hydroxy azo dye used as an intermediate in the preparation of a 2:1 chrome-complexed dye developer of Formula N. The illustrative preparation involves the following reaction scheme:

Step 1.
Diazotization Step

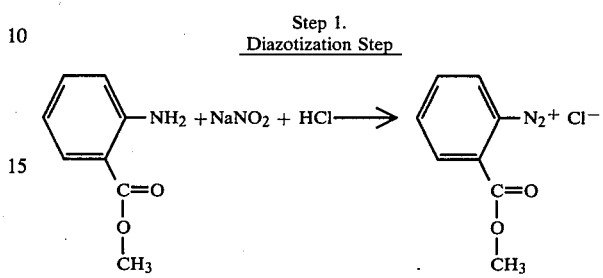

methylanthranilate

STEP 2
(Coupling Step)

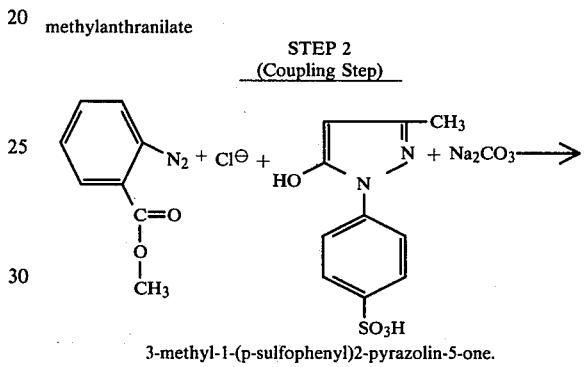

3-methyl-1-(p-sulfophenyl)2-pyrazolin-5-one.

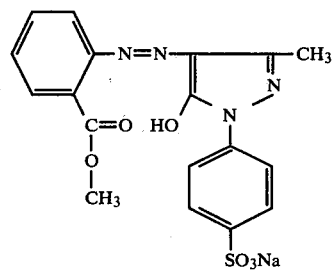

STEP 1

(Diazotization Step)

30.2 gms. of methyl anthranilate (0.2 M) were suspended in 150 mls. $H_2O$ and 50 mls. concentrated HCl (0.6 M) were added to the suspension. The mixture was then chilled to 0°–5° C. and 13.8 gms. of sodium nitrite (0.2 M) in 5 mls. $H_2O$ were added dropwise with stirring. Stirring of the solution was continued at 5°–10° C. for about 10–15 minutes.

STEP 2

(Coupling Step)

50.8 gms. of 3 methyl-1-(p-sulfophenyl)2-pyrazolin-5-one (0.2 M) were dissolved in 25 mls. $H_2O$ and 200 mls. isopropyl alcohol together with 42.4 gms. $Na_2CO_3$ (0.4 M). An ice bath was used to cool the solution to about 10° C. The solution of Step 1 was then added with stirring and a yellow precipitate formed. The mixture was stirred overnight at room temperature. 500 mls. of isopropyl alcohol was added and the mixture was heated on a steam bath until the yellow precipitate was dissolved. The solution was allowed to cool slowly to room temperature. The yellow needles formed on cooling were washed with 200 mls. isopropyl alcohol and air dried. Yield of solid product was 88 gms. (95% theoretical).

The product of step 2 was then reacted with thionyl chloride to provide the following product:

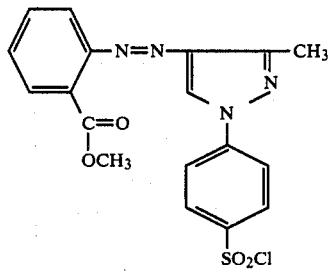

The reaction was conducted as follows:

43.5 gms. (0.1 M) of the product of Step 2 were suspended in 400 mls. of N,N-dimethylformamide and while the mixture was stirred, 50 gms. of thionyl chloride (0.46 M) were added dropwise so as to keep the reaction temperature below 40° C. No cooling was used and the temperature was controlled by the thionyl chloride addition rate. After addition of thionyl chloride, the reaction mixture was stirred overnight at room temperature. A bright yellow solid was precipitated by stirring the reactive mixture in 1 liter of chipped ice. The precipitate was filtered, washed with 250 mls. of hexane and air dried overnight. Yield of yellow product was 35 gms. (80% theoretical) m.p. 227°–229° C.

EXAMPLE 2

This Example illustrates a preparation of protected silver halide developing substituent which is reacted with the product of Example 1 to provide an ortho carboxy, ortho' hydroxy azo dye intermediate having a protected silver halide developing capability. The illustrative preparation involves the following reaction scheme:

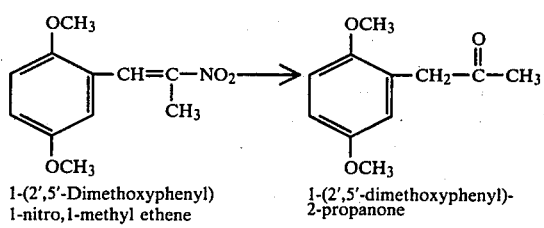

1-(2',5'-Dimethoxyphenyl) 1-nitro,1-methyl ethene 1-(2',5'-dimethoxyphenyl)-2-propanone

STEP 1

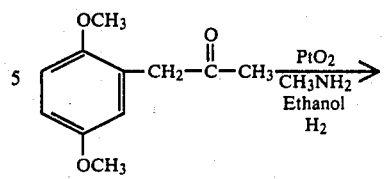

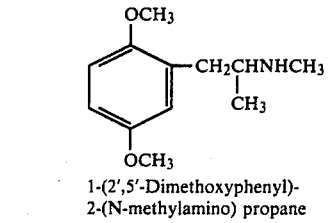

1-(2',5'-Dimethoxyphenyl)-2-(N-methylamino) propane

STEP 2

STEP 1

The following ingredients were added to a 12 liter, 3-neck flask fitted with heating mantle and stirrer:

| | |
|---|---|
| 1000 gms. | 2-(2',5'-Dimethoxyphenyl) 1,nitro,1-methyl ethene |
| 1340 gms. | iron filings (20 mesh) degreased |
| 2680 mls. | H$_2$O |
| 1000 mls. | benzene |
| 18 gms. | FeCl$_3$ |

The mixture was stirred, brought to reflux and 1300 mls conc. HCl were added dropwise over about one hour. After the addition of HCl, the mixture was refluxed for about 12 hours, then cooled to room temperature and filtered through a Celite pad. The filter pad was slurried with benzene and filtered again. The filtrates were combined and the organic layer was separated dried over MgSO$_4$, filtered, and the benzene removed by rotary evaporation. The product, a tan liquid, distilled at 140° C. at 1.5–2 mm. Yield of product was 604 gms. (69.5% theoretical).

STEP 2

A 2 liter stirred autoclave was cooled and 2.1 gms. PtO$_2$ and 350 gms. 1-(2',5'-dimethoxyphenyl)-2-propanone were added. A cooled solution of 111 gms. monomethyl amine in 560 mls. ethanol was added and the autoclave was then charged with hydrogen (129 psi) Hydrogen uptake was rapid over the first two hours and the autoclave was stirred overnight. The product was then discharged from the autoclave, catalyst filtered from the product and the solvents were rotary evaporated. The 1-(2',5'-dimethoxyphenyl)-2-(N-methyl amino) propane distilled at about 130° C. at 0.5 mm.

EXAMPLE 3

This Example illustrates a preparation of an ortho carboxy, ortho' hydroxy azo dye developer intermediate by reacting the products of Examples 1 and 2. The illustrative preparation involves the following reaction scheme:

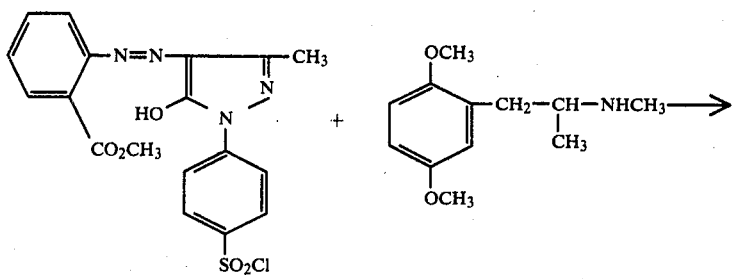

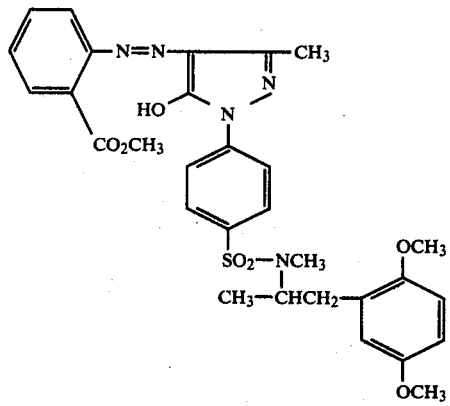

The azo dye of Example 1 (21.6 g.; 0.05 mole), the blocked developer of Example 2 (14.5 g.; 0.05 mole) and triethylamine (5.0 g.; 0.05 mole) were combined with toluene (500 ml.) in a one liter round-bottom flask equipped with $N_2$-inlet, thermometer, mechanical stirrer, condenser, drying tube, and heating mantle. The reaction was heated for 2 hours at 80°–85° C., after which time the thin layer chromatography (TLC) (Silica, $cHCl_3$) no longer showed any starting material. The reaction was then cooled to room temperature, the triethylamine hydrochloride filtered out and the filtrate was rotary evaporated to an orange oil which solidified in a glassy form. The product was recrystallized from 2 l. ethanol 2 B. Yield: 21.5 g.; 71%.

Properties of Compound: MOL.WT.: 607.69; MOL. FORMULA: $N_5O_7SC_{30}H_{33}$. m.p.: 149°–56° b.p.: Color and State: Yellow Solid. Soly.: toluene, $CH_2Cl_2$, $CHCl_3$. UV, Visible: PANo. 20393λ max=395 Solvent: $CHCl_3$; $\epsilon = 27,600$.

|  |  | C | H | N | S |
|---|---|---|---|---|---|
| Elemental Analysis: | Found: | 59.93 | 5.54 | 11.97 | 5.45 |
|  | Theory: | 59.30 | 5.47 | 11.52 | 5.28 |

EXAMPLE 4

This Example illustrates a preparation in which both the 2′,5′-dimethoxy groups substituted on the phenyl radical and the methyl ester of the compound of the above Example are converted to hydroxy substituents. The illustrative preparation involves the following reaction scheme:

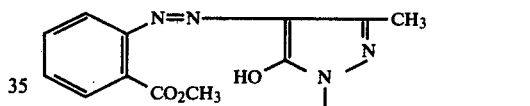

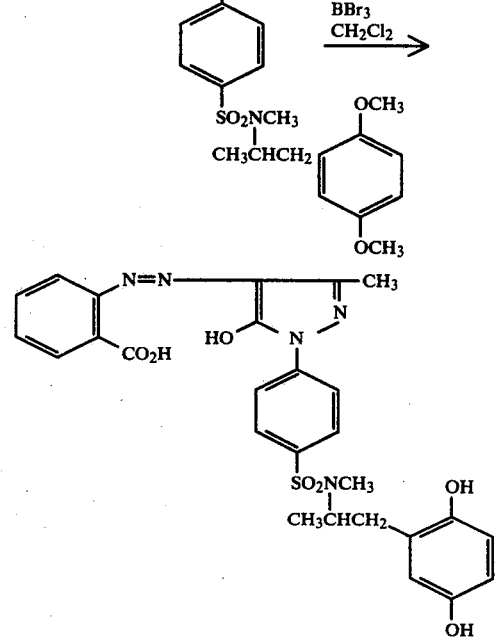

Boron tribromide 20 g (d=2.64 g/ml.; 0.08 mole) was dissolved in $CH_2Cl_2$ (50 ml.) in a previously flamed system consisting of a 3-neck 1-liter round bottom flask equipped with dropping funnel (250 ml.), $N_2$-inlet, mechanical stirrer, condenser, and drying tube. The reaction flask was surrounded by a cold water bath (10°–15° C.). The dye (Example 3; 6.0 g.; 0.01 mole) was dissolved in 180 ml. CH₂Cl₂ and added to the stirred reaction mixture over 1 hour via the dropping funnel. Solid K. The illustrative preparation involves the following reaction scheme:

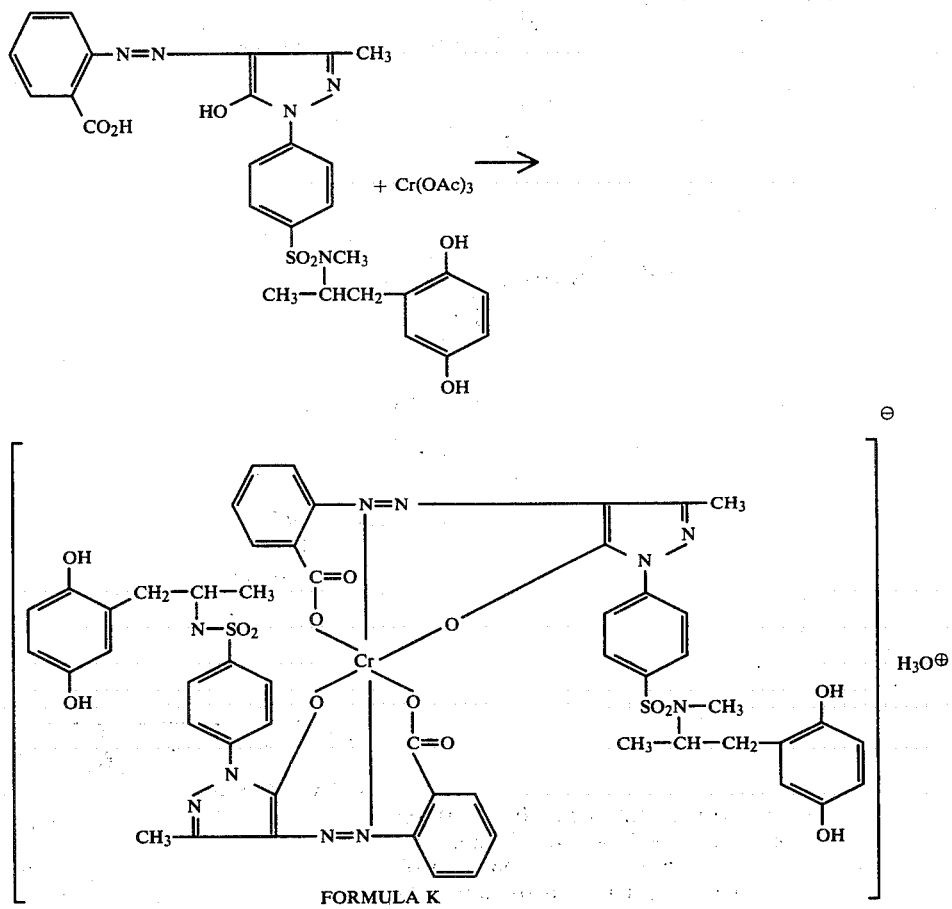

FORMULA K precipitated during the addition. The reaction mixture was stirred for 1½ hours after the addition was complete and the water bath was allowed to warm gradually to r.t. when it was replaced with another ice bath. 150 ml. ethyl ether were added via the dropping funnel, with the first few ml. added very cautiously. When addition was complete, the ice bath was exchanged for a hot water bath and ether and CH₂Cl₂ were distilled off. 300 ml. hot water were added to the orange residue in the flask and stirred vigorously for 15 minutes. The orange solid was filtered out and washed with water and recrystallized from 300 ml. methoxy ethanol.

Properties of the Compound:

MOL.WT.: 565.61; MOL. FORMULA: $N_5O_7SC_{27}H_{27}$. m.p.: 290°-3° b.p.: Color and State: Yellow Solid. Soly.: 2% in hot methyl cellosolve. UV, Visible: PANo. 20394λ max=397. Solvent: methyl cellosolve ε=26,000.

|  | C | H | N | S |
|---|---|---|---|---|
| Elemental Analysis: Found: | 56.96 | 4.98 | 12.39 | 5.62 |
| Theory: | 57.34 | 4.81 | 12.38 | 5.67 |

EXAMPLE 5

This Example illustrates a preparation of the 2:1 chrome-complexed yellow dye developer of Formula K. The illustrative preparation involves the following reaction scheme:

The dye developer (Example 4, 20 g.; 35.4 m mole), chromium acetate (8.75 g.; 35.4 m mole), triethylamine (3.6 g.; 35.6 m mole), and DMF (dimethyl formamide) (200 ml.) were combined in a 3-neck 500 ml. round bottom flask equipped with N₂-inlet, thermometer condenser, magnetic stirrer and heating mantle. The mixture was stirred under a gentle flow of nitrogen and heated at 100°-110° C. for one hour.[1] The cooled reaction mixture was poured into 2 l water containing a little concentrated HCl. A brown solid was filtered out, washed generously with water and air dried.

The crude solid was dissolved in 100 ml. DMF at room temperature. The filtered solution was precipitated into 1 liter filtered water containing a little concentrated HCl. A brown solid was filtered out, washed with water and air dried.

This solid was precipitated twice more in a similar manner using methanol (300 ml. and 150 ml.) and filtered water (3 l and 1.5 l) containing a little concentrated HCl.

The material which is not soluble in the first methanol solution should not be discarded. If it is precipitated again using DMF (~30 ml.) and filtered water (300 ml.) containing a little concentrated HCl, pure material will be obtained.

(1) Reaction may be followed by TLC (silica, 10% MeOH/CHCl₃).

Properties of Compound:

MOL.WT.: 1198.21; MOL. FORMULATION: $N_{10}O_{14}S_2C_{54}H_{50};Cr;H_3O+$. Color and State: Brown Solid. Soly.: methanol, DMF. UV, Visible: PANo. 20490λ max=430. Solvent: methyl cellosolve ε=26,000.

|  | C | H | N | S | Cr |
|---|---|---|---|---|---|
| Elemental Analysis: Found: | 54.25 | 4.33 | 11.74 | 5.21 | 4.38 |
| Theory: | 54.13 | 4.46 | 11.69 | 5.35 | 4.34 |

EXAMPLE 6

This Example illustrates a preparation of an ortho carboxy, ortho' hydroxy azo dye intermediate used in the preparation of a 2:1 chrome-complexed yellow dye developer of Formula J. The illustrative preparation involves the following reaction scheme:

STEP 1
(Diazotization Step)

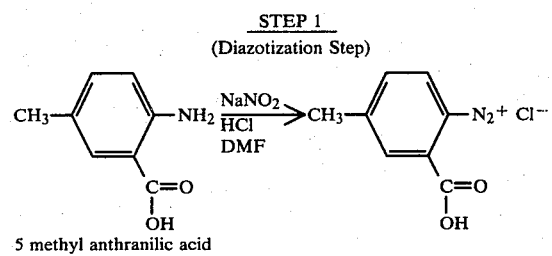

5 methyl anthranilic acid

STEP 2
(Coupling Step)

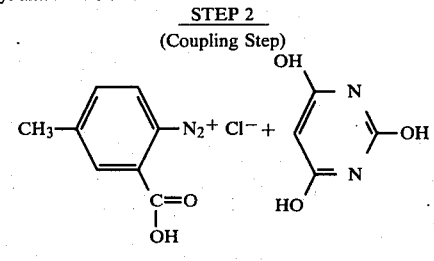

Barbituric Acid

-continued

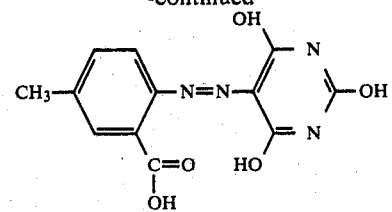

STEP 1—(Diazotization)

2.6 gms. of 5-methyl anthranilic acid were dissolved in 20 mls. distilled dimethyl formamide. The solution was chilled in ice/salt bath and 7 mls. concentrated HCl added and the solution chilled to 8° C. A solution of sodium nitrite was then added dropwise so that the temperature did not exceed 10° C. Total sodium nitrite added was 1.2 gms. Diazotization was complete in about ½ hour and the product was a pink suspension.

STEP 2 (Coupling)

The suspension of Step 1 was added portionwise to a solution containing 2.2 gms. barbituric acid and 7 gms. sodium carbonate in 200 mls. H₂O. The mixture was then stirred for about 20 minutes. A yellow solid product was collected and dried overnight m.p. >335° C.

EXAMPLE 7

This Example illustrates a preparation of a protected 2:1 chrome-complexed yellow dye developer of Formula J. The preparation essentially involves the chrome complexing of the ortho carboxy, ortho' hydroxy azo dye of Example 6 with an ortho, ortho' dihydroxy azo methine dye. The illustrative preparation involves the following reaction scheme:

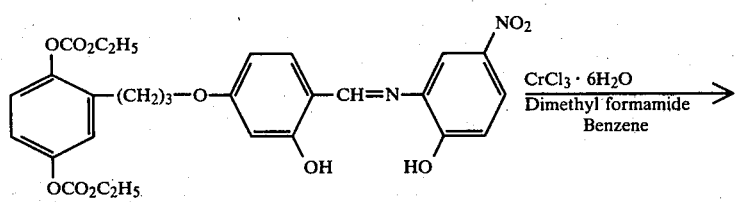

FORMULA S          NOTE A

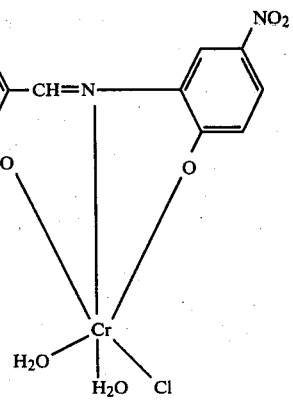

STEP 1
(Chrome Complexing the Azomethine Dye)

-continued

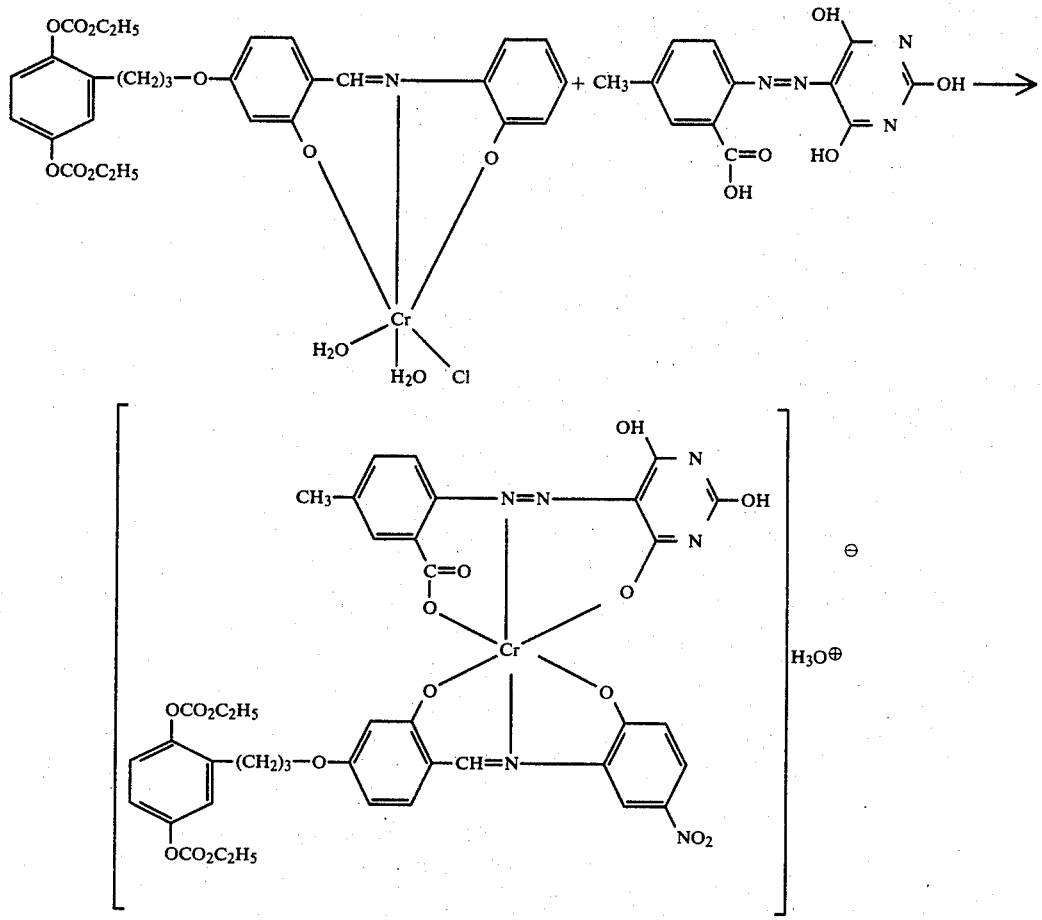

STEP 2
PROTECTED DYE DEVELOPER OF FORMULA J

Note A.
The preparation of this ortho, ortho' dihydroxy azomethine dye is described in detail in my U.S. Pat. Application Ser. No. (Case No.) filed concurrently.

STEP 1

The following ingredients were refluxed in a 1 liter round bottom flask equipped with a magnetic stirrer:

| | |
|---|---|
| $CrCl_3 \cdot 6H_2O$ | 9.37 gms. |
| Dimethyl formamide (anhydrous) | 153 mls. |
| Benzene (anhydrous) | 220 mls. |

The above solution was refluxed with stirring until the azeotrope (benzene/water) was completely boiled off leaving an anhydrous solution of chromic chloride in dimethyl formamide. Then 10 gms. of the ortho, ortho' dihydroxy azomethine dye of Formula S were added and the solution was refluxed for 45 minutes.

The reaction product was precipitated in 2500 mls. of well stirred distilled water (room temperature) and then filtered and washed three times with distilled water. Yield 6.68 gms. of a tan solid product.

STEP 2

The following ingredients were added to a 50 ml. round bottom flask equipped with a magnetic stirrer and a condenser:

| | |
|---|---|
| Ortho carboxy, ortho' hydroxy azo dye of Example 6 | 1 gm. |
| Chromed ortho,ortho' dihydroxy azomethine dye of Step 1 | 1.87 gm. |
| Methyl cellosolve | 24 mls. |
| Triethylamine | 0.43 mls.(.3114 gms.) |

The ingredients (solution) were stirred and refluxed for ½ hour then cooled to about 2° C. Trace insolubles were filtered from the cooled solution and the product was precipitated in 450 mls. of well stirred ether. The product was filtered off while slowly adding ether during the filtration until all dimethyl formamide was gone. Yield of tan-yellow solid product was over 2.8 gms.; $\epsilon_{(440)} = 32,000$.

EXAMPLE 8

This Example illustrates a procedure for converting the protective (dicathyloxy) groups of the azomethine moiety of the 2:1 chrome-complexed dye of Example 7 to hydroxy groups to provide the 2:1 chrome-complexed yellow dye developer of Formula J. The illustrative procedure involves the following reaction scheme:

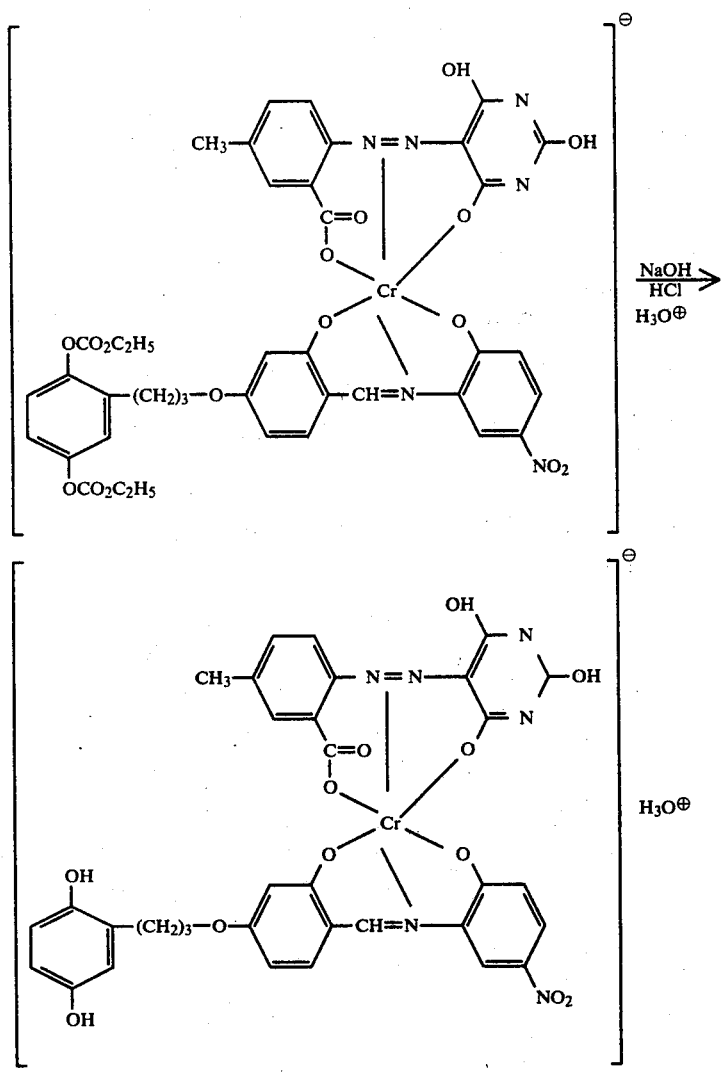

FORMULA J

In a 3-neck, 250 ml. round bottom flask, 2.69 gms. of the protected 2:1 chrome-complexed dye of Example 7 were dissolved in 27 mls. methyl cellosolve at room temperature. Nitrogen was bubbled through the solution to deaerate it and then the system was flushed with nitrogen. An alkaline solution of 4.66 gms. of NaOH in 47 mls. H$_2$O were placed in a dropping funnel and the solution was deaerated with nitrogen. The alkaline solution was then added to the dye solution while the dye solution was stirred and with nitrogen flowing through the solution. The dye solution was stirred at room temperature for 25 minutes. An ice bath was placed around the flask and after about 5 minutes, an ice cold deaerated solution of 9.63 mls. concentrated HCl in 86.7 mls. H$_2$O were added at a moderate rate to the dye solution. The tan product precipitated out when the solution became acidic. The product was filtered off, washed twice on the filter with distilled H$_2$O and dried overnight at room temperature. Yield of light brown product 1.83 gms. (80.57% theoretical).

Properties of Compound:

MOL.WT.: MOL. FORMULA: Color and State: Light Brown Solid. Soyl.: Methanol, Methyl Cellosolve, Dimethyl Formamide. UV, Visible: λ max=440. Solvent: Methyl Cellosolve ε=32,000.

| | | C | H | N | Cr |
|---|---|---|---|---|---|
| Elemental Analysis | Found: | 52.08 | 3.79 | 10.65 | 6.78 |
| | Theory: | 52.24 | 3.74 | 10.75 | 6.65 |

Example 9 which follows presents a comparison of the performance characteristics of the particularly preferred 2:1 chrome-complexed yellow dye developer of this invention (the 2:1 chrome-complexed yellow dye developer of Formula K) and a 1:1 chrome-complexed yellow dye developer extensively used in commercial film units (the 1:1 chrome-complexed dye developer of Formula B). The comparison involved diffusion transfer film units having multicolor photosensitive elements which contained the following cyan and magenta dye developers:

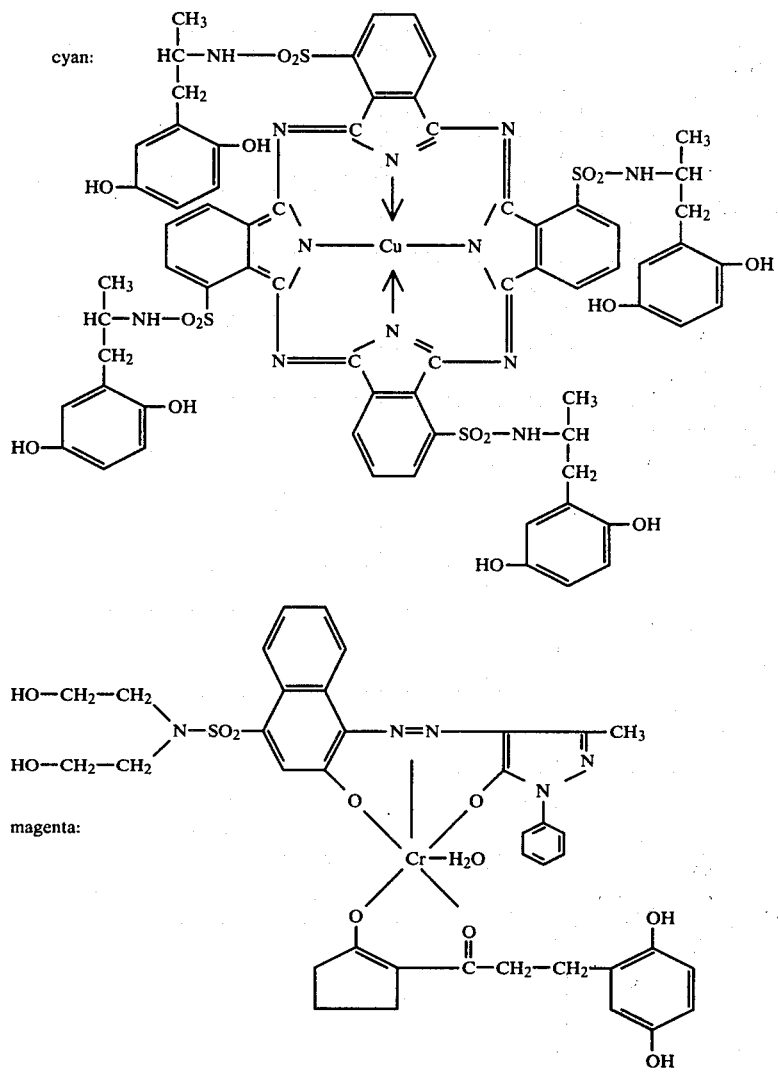

Also, except for variations in the yellow dye developer layer which are explained in Example 9, the photosensitive elements of the film units of Example 9 were prepared by coating a gelatin-subcoated, 4 mil., opaque polyethylene terephthalate film base with the following layers:
1. a layer of cyan dye developer and 2-phenyl benzimidazole (antifoggant) dispersed in gelatin and coated at a coverage of about 55 mgs./ft.$^2$ dye, about 22 mgs./ft.$^2$ of 2-phenyl benzimidazole, 112 mgs./ft.$^2$ of gelatin;
2. a red-sensitive gelatino silver iodobromide emulsion coated at a coverage of about 80 mgs./ft.$^2$ of silver and about 104 mgs./ft.$^2$ of gelatin;
3. a layer of a 60-30-4-6 tetrapolymer of butylacrylate, diacetone acrylamide, styrene and methacrylic acid and polyacrylamide coated at a coverage of about 428 mgs./ft.$^2$ of the copolymer and about 23 mgs./ft.$^2$ of polyacrylamide;
4. a layer of magneta dye developer and 2-phenyl benzimidazole dispersed in gelatin and coated at a coverage of about 60 mgs./ft.$^2$ of dye about 21 mgs./ft.$^2$ of 2-phenyl benzimidazole and about 40 mgs./ft.$^2$ of gelatin;
5. a green-sensitive gelatino silver iodobromide emulsion coated at a coverage of about 60 mgs./ft.$^2$ of silver and about 43 mgs./ft.$^2$ of gelatin;
6. A layer containing the tetrapolymer referred to above in layer 3 and polyacrylamide coated at a coverage of about 230 mgs./ft.$^2$ of copolymer and about 20 mgs./ft.$^2$ of polyacrylamide;
7. a layer of a yellow dye developer and 2-phenyl benzimidazole dispersed in gelatin and coated at the coverage specified in Example 9.
8. a blue-sensitive gelatino silver iodobromide emulsion layer coated at a coverage of about 119 mgs./ft.$^2$ of silver and about 52 mgs./ft.$^2$ of gelatin and
9. a layer of carbon black dispersed in gelatin coated at a coverage to provide about 4 mgs./ft.$^2$ of carbon black and about 40 mgs./ft.$^2$ of gelatin.

The image-receiving elements of the film units of Example 9 were prepared by coating transparent 4 mil polyethylene terephthalate film base with the following layers:
1. as a polymeric acid layer, the partial butyl ester of polyethylene/maleic anhydride copolymer at a coverage of about 2,500 mgs./ft.$^2$;

2. a timing layer containing about a 40:1 ratio of a 60-30-4-6 tetrapolymer of butylacrylate, diacetone acrylamide, styrene and methacrylic acid and polyvinyl alcohol at a coverage of about 500 mgs./ft.$^2$; and 3. a polymeric image-receiving layer containing a 2:1 mixture, by weight, of polyvinyl alcohol and poly-4-vinylpyridine, at a coverage of about 300 mgs./ft.$^2$.

The so prepared image-receiving and photosensitive elements can be taped together with opaque tape extending around the edges to provide an integral film unit. A rupturable container retaining an aqueous alkaline processing solution was mounted in a fixed position on the leading edge of each of the elements, by pressure-sensitive tapes, so that, pressure applied to the container would rupture the container's marginal seal and its contents could be distributed between the image-receiving layer and the gelatin overcoat layer of the photosensitive element.

In each of the film units of Example 9, the aqueous alkaline processing composition comprised:

processing composition may be distributed by passing the film unit between a pair of pressure-applying rolls.

EXAMPLE 9

This Example presents a comparison of dye stability measurements for two film units, one containing a 1:1 chrome-complexed yellow dye developer of the prior art and the other containing a 2:1 chrome-complexed yellow dye developer of this invention. FIG. 4 graphically depicts the dye stability measurements.

The two film units had multicolor photosensitive elements prepared as described before and were substantially the same except for the yellow dye developer layers. In the film unit designated as 2069-150 of FIG. 4, the yellow dye containing layer contained the 2:1 chrome-complexed yellow dye developer of Formula K and 2-phenyl benzimidazole dispersed in gelatin at a coverage of about 8.7 mgs./ft.$^2$ yellow dye developer, about 20 mgs./ft.$^2$ of 2-phenyl benzimidizole and about 18 mgs./ft.$^2$ of gelatin. In the film unit designated as

| Water | 1918 | cc |
|---|---|---|
| Potassium hydroxide (85%) | 509 | g. |
| N-phenethyl-α-picolinium bromide (50% solution in water) | 110.4 | g. |
| Carboxymethyl cellulose (Hercules Type 7H4F providing a viscosity of 3,000 cps. at 1% in water at 25° C.) 95% solids | 80.3 | g. |
| Titanium dioxide | 1842 | g. |
| 6-methyl uracil | 9.3 | g. |
| bis-(β-aminoethyl)-sulfide | 1.4 | cc |
| Lithium nitrate | 4.8 | g |
| Benzotriazole | 34.6 | g. |
| Colloidal silica aqueous dispersion (30% SiO$_2$) | 77.6 | g. |
| N-2-hydroxyethyl-N,N',N'-tris-carboxymethyl-ethylene diamine | 36.4 | g. |
| Polyethylene glycol (molecular weight 6,000) | 22.7 | g. |
| 4-amino pyrazolo pyrimidine | 11.3 | g. |
| (2-benzimidazoyl methyl) sulfide hydrate | 0.95 | g. |
|  | 93.4 | g. |
|  | 20.8 | g. |

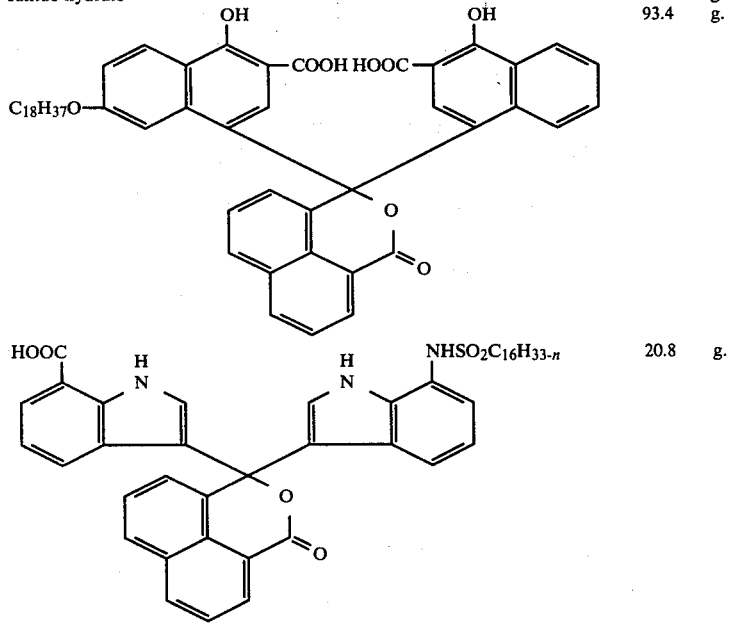

The photosensitive element of such prepared integral film units may be exposed through the transparent support of the image-receiving element, and a layer of the 2069-130 of FIG. 4, the yellow dye developer layer contained the 1:1 chrome complexed yellow dye developer of Formula B and 2-phenyl benzimidazole dispersed in gelatin at a coverage of about 67 mgs./ft.$^2$ of yellow dye developer, about 18 mgs./ft.$^2$ of 2-phenyl benzimidazole and about 33 mgs./ft.$^2$ of gelatin. It will be noted that the coverages of yellow dye developer in each film unit are different (87 mgs./ft.$^2$ V. 67 mgs./ft.$^2$). This difference, however, was intended and is based on considerations involving such factors as the extinction coefficient, the molecular weight and the molecular structure of each dye developer to estimate coverages for each dye developer which can provide approximately equivalent yellow optical densities for each exposed and processed film unit.

The film units were exposed to two meter candle seconds through a yellow filter and processed by passing each film unit between a pair of pressure-applying rolls to thereby distribute a layer of processing composition about 0.0028" thick between the image-receiving layer and the gelatin/carbon black overcoat of the photosensitive element. Under such exposure conditions only yellow dye was transferred to the image-receiving layer and both processed film units had comparable yellow color densities.

The processed film units were maintained at room temperature for twenty-four hours and then the dye stability of each unit was determined by exposing each unit to the conditions of a Xenon Arc Weatherometer over a period of forty days and periodically measuring the percent yellow dye retained for each unit. During this forty-day period, the light output for the Weatherometer ranged between 7000 to 9000 foot candles. FIG. 4 graphically depicts the data obtained over the forty-day period and the data clearly evidences superior performance characteristics for the preferred 2:1 chrome-complexed yellow dye of Formula K (Film Unit 2069-150) especially in terms of the stability of dye.

Example 10 which follows presents a comparison of the performance characteristics of another 2:1 chrome-complexed yellow dye developer of this invention (the 2:1 chrome-complexed yellow dye developer of Formula J) and the 1:1 chrome-complexed yellow dye developer of Formula B. This comparison involved monochrome diffusion transfer film units having photosensitive elements which were prepared by coating a gelatin subcoated, 4 mil., opaque polyethylene terephthalate film base with the following layers:

1. a layer of gelatin coated at a coverage of about 30mgs./ft.$^2$ and about 7.5 mgs./ft.$^2$ of 4-methylphenylhydroquinone;

2. a layer of a blue-sensitized silver halide emulsion coated at a coverage of about 150 mgs./ft.$^2$ of silver and about 150 mgs./ft.$^2$ of gelatin;

3. a layer of yellow dye developer dispersed in gelatin and coated at the coverages specified in Example 10.

The image-receiving element of the monochrome film units of Example 10 were prepared by coating a transparent 4 mil. polyethylene terephthalate film base with the following layers:

1. as a polymeric acid layer, the partial butyl ester of polyethylene/maleic anhydride copolymer at a coverage of about 2,500 mgs./ft.$^2$;

2. a timing layer containing about 40:1 ratio of a 60-30-4-6 tetrapolymer of butylacrylate, diacetone acrylamide, styrene and methacrylic acid and polyvinyl alcohol at a coverage of about 500 mgs./ft.$^2$; and 3. a polymeric image-receiving layer containing a 2:1 mixture, by weight, of polyvinyl alcohol and poly-4-vinylpyridine, at a coverage of about 300 mgs./ft.$^2$ The so prepared image-receiving and photosensitive elements can also be taped together with opaque tape extending around the edges to provide an integral film unit. A rupturable container retaining an aqueous alkaline processing solution was mounted in a fixed position on the leading edge of each of the elements, by pressure-sensitive tapes, so that, pressure applied to the container would rupture the container's marginal seal and its contents could be distributed between the image-receiving layer and the gelatin overcoat layer of the photosensitive element.

In each of the film units of Example 10, the aqueous alkaline processing composition comprised:

| | | |
|---|---|---|
| Water | 1097 | cc |
| Sodium carboxymethyl cellulose (Hercules Type 7H4F providing a viscosity of 3000 cps. at 1% in water @ 25° C.) 95% solids | 32.4 | gms. |
| Potassium hydroxide (85%) | 30. | gms. |
| Lithium hydroxide | 6. | gms. |
| Benzotriazole | 8.5 | gms. |
| Azabenzimidazole | 0.4 | gms. |
| 6-methyl uracil | 8.9 | gms. |
| Lithium nitrate | 3. | gms. |
| 6-benzylamino-purine | 11.9 | gms. |
| N-2-hydroxyethyl-N,N',N'-tris-carboxymethyl-ethylene diamine | 25.1 | gms. |
| bis-($\beta$-aminoethyl)-sulfide | 2.2 | gms. |
| TiO$_2$ | 126.7 | gms. |
| Polyethylene glycol (M.W. 6000) | 16.3 | gms. |
| Colloidal Silica (aqueous dispersion 30%) | 55.3 | gms. |
| N-phenethyl-$\alpha$picolinium bromide (50% soln.) | 42.4 | gms. |
| N-benzyl-$\alpha$picolinium bromide (50% soln.) | 54.6 | gms. |

The photosensitive element of the monochrome film units may be exposed through the transparent support of the image-receiving element and a layer of processing composition may be distributed between the image-receiving and photosensitive elements by passing the film unit between a pair of pressure applying rolls.

EXAMPLE 10

As mentioned, this Example presents a comparison of dye stability measurements for two film units one containing a 1:1 chrome-complexed yellow dye developer of the prior art and the other containing a 2:1 chrome-complexed yellow dye developer of this invention. FIG. 5 graphically depicts the dye stability measurements. The two film units had monochrome photosensitive elements prepared as described above and were substantially the same except for the yellow dye developer layers. In the Film Unit designated as DP1 of FIG. 5, the yellow dye developer containing layer contained the 2:1 chrome-complexed yellow dye developer of Formula J dispersed in gelatin at a coverage of about 26.7 mgs./ft.$^2$ of dye developer and about 40 mgs./ft.$^2$ of gelatin. In the Film Unit designated as DP2 of FIG. 5, the yellow dye developer containing layer contained the 1:1 chrome-complexed yellow dye developer of Formula B dispersed in gelatin at a coverage of about 40 mgs./ft.$^2$ of dye developer and about 40 mgs./ft.$^2$ of gelatin.

The film units were exposed to two meter candle seconds through a yellow filter and processed by passing each film between pressure-applying members to distribute a layer of processing composition about 0.0022" thick between the image-receiving element and the photosensitive element. Both processed film units had comparable yellow color. Dye stability measurements were made as described in Example 9 except that the light output for the Weatherometer ranged from about 7000 ft. candles to about 11,000 ft. candles during the forty-day period. FIG. 5 graphically depicts the data obtained over the forty-day period and the data indicates that both dyes have substantially equivalent stability performance characteristics.

From the above description, it should be apparent that the present invention presents to the art novel 2:1 chrome-complexed yellow dye developers having a desirable degree of performance characteristics in terms of color as well as stability. Accordingly, many modifications can be made in details of the above Examples offered for the purposes of illustrating preferred embodiments of the invention without departing from the spirit and scope of the invention defined in the claims.

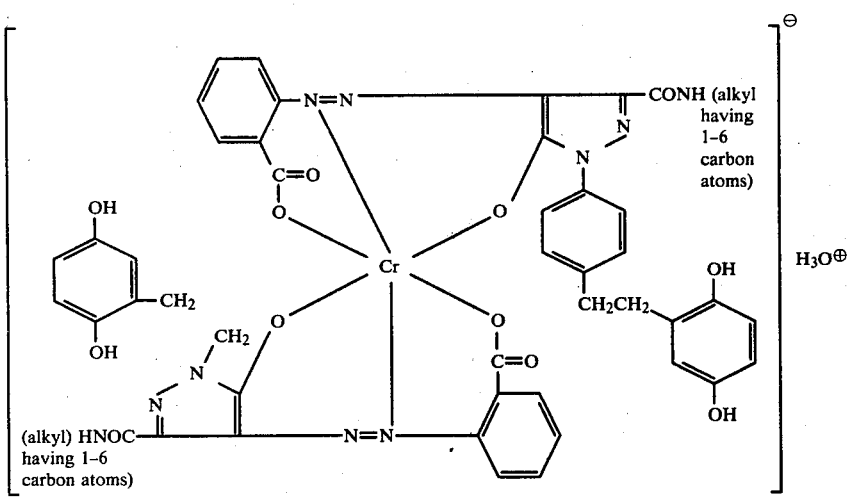
7. A 2:1 chrome-complexed yellow dye developer as defined in claim 1 which is represented by the structural formula
8. A 2:1 chrome-complexed yellow dye developer as defined in claim 1 which is represented by the structural formula
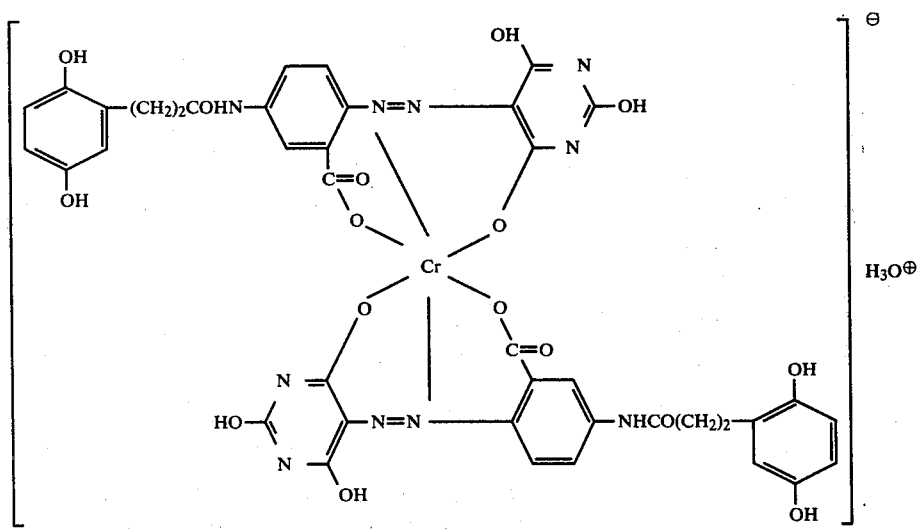

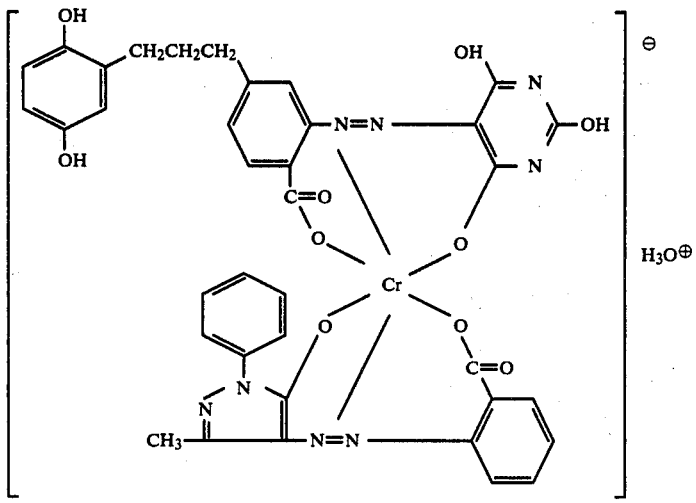
9. A 2:1 chrome-complexed yellow dye developer as defined in claim 1 which is represented by the structural formula
10. A 2:1 chrome-complexed yellow dye developer as defined in claim 1 which is represented by the structural formula
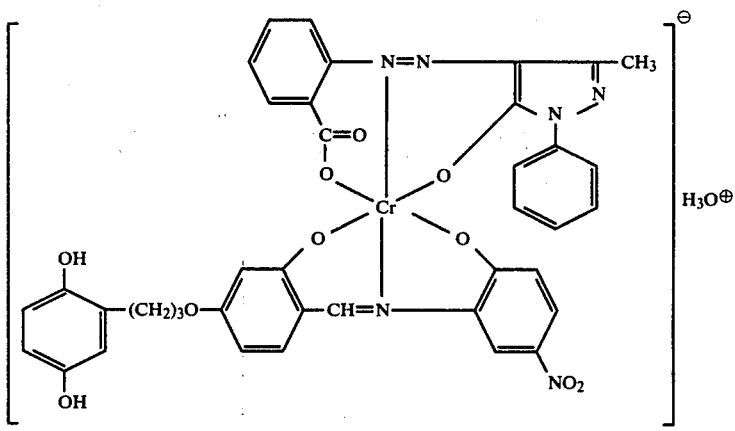
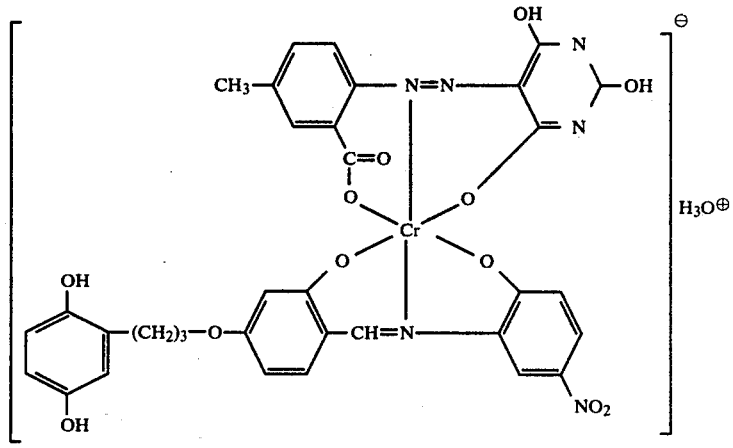
11. A 2:1 chrome-complexed yellow dye developer as defined in claim 1 which is represented by the structural formula 12. A 2:1 chrome-complexed yellow dye developer as defined in claim 1 which is represented by the structural formula
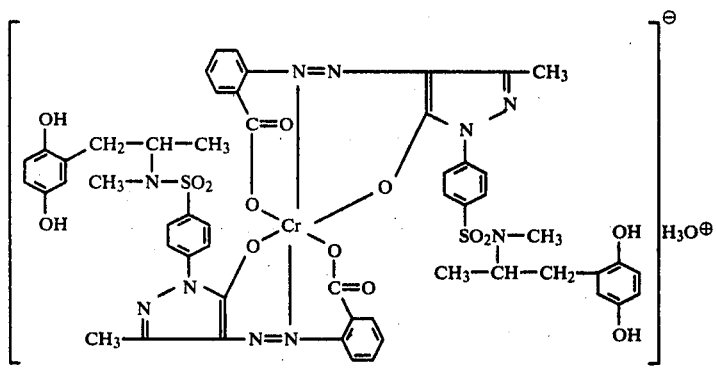
defined in claim 1 which is represented by the structural formula
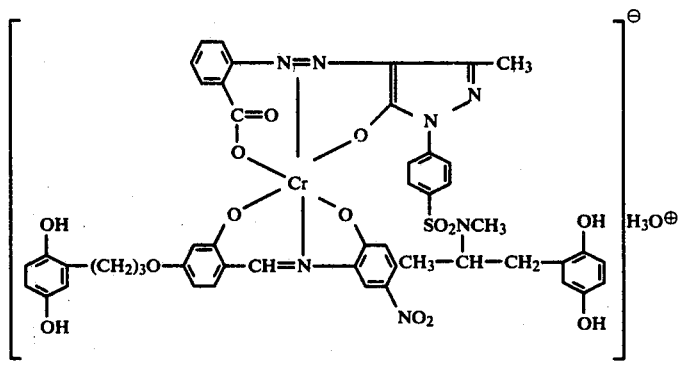
* * * * *
13. A 2:1 chrome-complexed yellow dye developer as
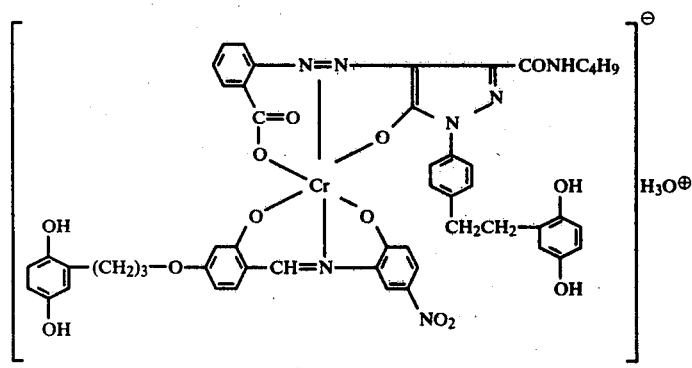

What is claimed is:

1. A 2:1 chrome-complexed yellow dye developer of two ortho carboxy, ortho' hydroxy azo dyes or a 2:1 chrome-complexed yellow dye developer of an ortho carboxy, ortho' hydroxy azo dye and an ortho, ortho' dihydroxy azomethine dye, said dye developer being represented by the structural formula

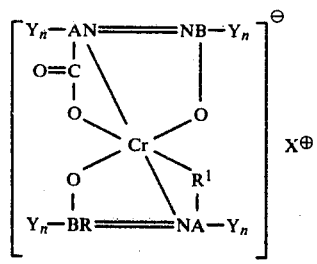

where each A is a phenyl radical; each B is a phenyl radical or a pyrazolone radical or a pyrimidine radical; Y is a silver halide developing substituent; each n is 0 or 1 but at least one n must be 1: R is N or CH; $R^1$ is

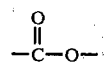

if R is N but $R^1$ is —O— if R is CH; and X is a cation.

2. A 2:1 chrome-complexed yellow dye developer as defined in claim 1 which is represented by the structural formula

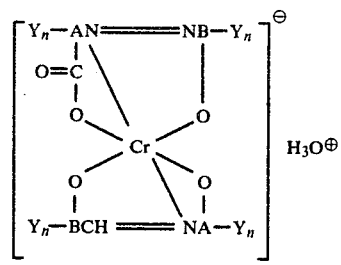

wherein Y is a hydroquinonyl group.

3. A 2:1 chrome-complexed yellow dye developer as defined in claim 1 which is represented by the structural formula

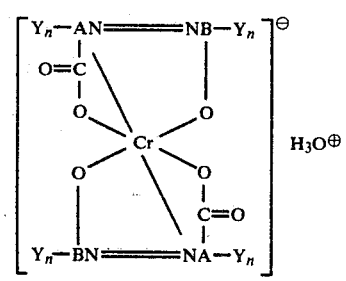

wherein Y is a hydroquinonyl group.

4. A 2:1 chrome-complexed yellow dye developer as defined in claim 1 which is represented by the structural formula

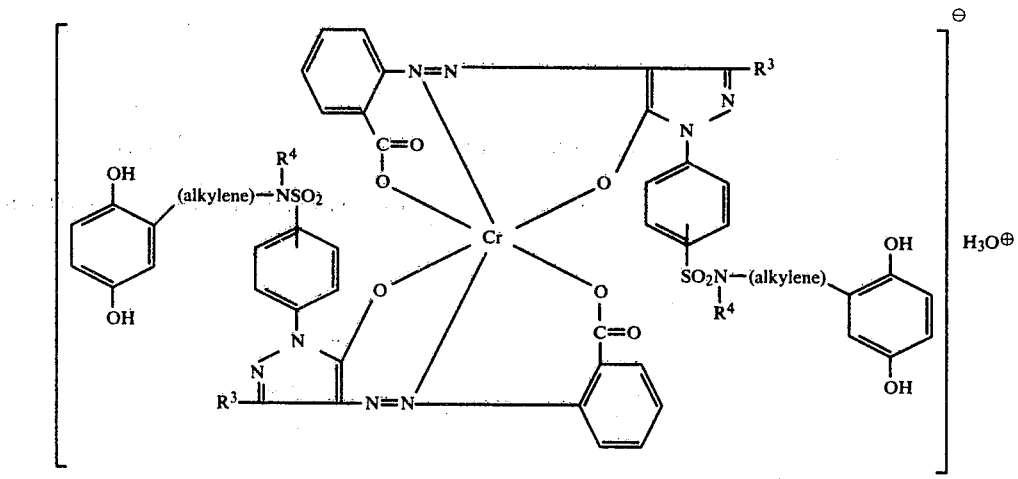

where $R^3$ is hydrogen, hydroxyl, alkyl having from 1–6 carbon atoms or

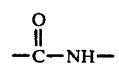

-(alkyl having 1–6 carbon atoms)- and, -(alkylene)- has from 0–6 carbon atoms and $R^4$ is hydrogen or lower alkyl.

5. A 2:1 chrome-complexed yellow dye developer as defined in claim 1 which is represented by the structural formula

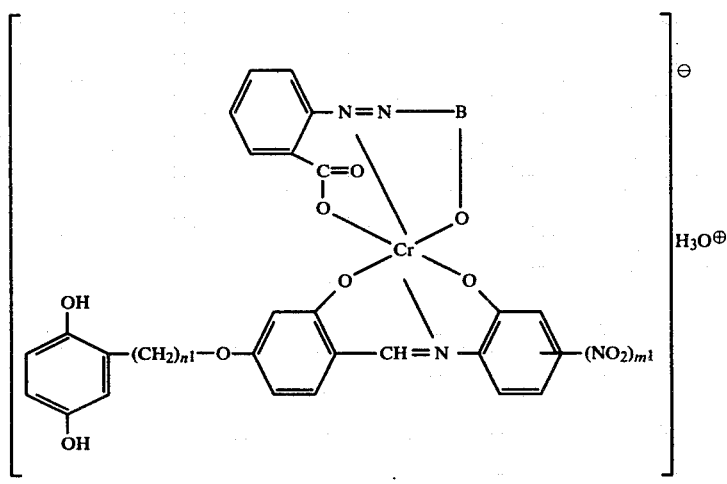

where $n^1$ is the integer 1–8; $m^1$ is the integer 1 or 2 and B is the radical: Serial No. 930,152

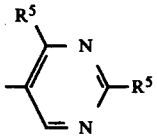

where $R^5$ is hydrogen or hydroxy or, B is the radical;

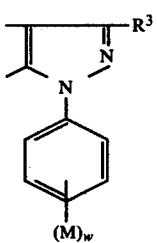

where $R^3$ is hydrogen, hydroxy, alkyl having from 1–6 carbon atoms or

(alkyl having 1–6 carbon atoms); w is the integer 0 or 1; M is

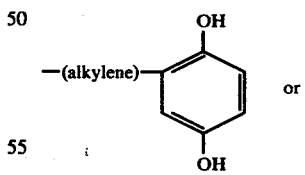

and, ―(alkylene)― has from 0–6 carbon atoms and $R^4$ is hydrogen or lower alkyl.

6. A 2:1 chrome-complexed yellow dye developer as defined in claim 1 which is represented by the structural formula